ary Examiner—Gerald Goldberg

United States Patent [19]
Stacey

[11] B 3,989,996
[45] Nov. 2, 1976

[54] FORCE COMMUTATION STATIC FREQUENCY CHANGER APPARATUS USING DIRECT CAPACITOR COMMUTATION

[75] Inventor: Eric J. Stacey, Pittsburgh, Pa.

[73] Assignee: Westinghouse Electric Corporation, Pittsburgh, Pa.

[22] Filed: Sept. 25, 1974

[21] Appl. No.: 509,185

[44] Published under the second Trial Voluntary Protest Program on February 3, 1976 as document No. B 509,185.

[52] U.S. Cl. ................................. 321/7; 321/45 C; 321/61
[51] Int. Cl.² .......................................... H02M 5/45
[58] Field of Search ................. 321/7, 45 C, 61, 65, 321/69

[56] References Cited
UNITED STATES PATENTS

| 3,337,788 | 8/1967 | Pelly | 321/65 |
| 3,431,483 | 3/1969 | Lafuze | 321/7 |
| 3,470,447 | 9/1969 | Gyugyi et al. | 321/7 |
| 3,493,838 | 2/1970 | Gyugyi et al. | 321/7 |
| 3,742,336 | 6/1973 | Bedford | 321/7 |
| 3,763,418 | 10/1973 | Beck et al. | 321/45 C |
| 3,842,341 | 10/1974 | Goldberg | 321/45 C |

*Primary Examiner*—Gerald Goldberg
*Attorney, Agent, or Firm*—C. M. Lorin

[57] ABSTRACT

An improved force commutated cycloconverter is provided by alternatively switching a capacitor to different groups of main thyristors including a thyristor to be commutated in the controlled sequence of thyristor conductions. The capacitor swing back to an opposite polarity before each successive commutation. Commutation is made possible at low load current by the adjunction of a resonant reset circuit. The force commutating circuit is applied to various configurations of cycloconverters.

23 Claims, 24 Drawing Figures

FORCE COMMUTATION STATIC FREQUENCY CHANGER APPARATUS USING DIRECT CAPACITOR COMMUTATION

CROSS-REFERENCE TO RELATED APPLICATIONS

The present application is related to the following concurrently filed patent application which is assigned to the same assignee as the present application: Ser. No. 509,168, which was filed on Sept. 25, 1974 by Eric J. Stacey.

BACKGROUND OF THE INVENTION

It has long been realized that the force commutated cycloconverter is best suited for supplying variable frequency AC power to control the speed of AC machines. That it can be advantageously used for other applications in view of its unique properties, has also been established.

A cycloconverter is comprised of a multiplicity of electronic "switches" (e.g., transistors, thyristors) used to fabricate an AC output voltage waveform from a multiphase input source. This is accomplished by sequentially switching segments of the input voltage waves to the output, so that the desired output waveform is produced. The operating principle of a cycloconverter is well-known in the art and is described in a book entitled "Thyristor Phase-Controlled Converters And Cycloconverters" by B. R. Pelly, published in 1971 by John Wiley and Sons. For the force commutated cycloconverter the output waveform is fabricated in such a manner that the "switches" have the ability to interrupt the flow of current at any time independently of the instantaneous input source voltages and of the load current.

In practice, the switches may be realized either by devices having intrinsic turn-off ability (i.e., transistors or gate controlled switches), or SCR devices often called thyristors with the additional force commutating circuitry which is necessary to terminate the conduction of this latter type of switches. Unfortunately, adequately rated "turn-off" devices which are workable in high power systems are not presently available, therefore the second type of switches, e.g. thyristors, must generally be used.

In the last decade considerable effort has been expended to devise techniques for force commutating thyristors in cycloconverters. However, most of the circuits developed to date have serious shortcomings, and are suitable only for rather limited applications. In view of the great potential advantage of the forced commutated cycloconverter, it is desirable to improve on the present commutating circuits, especially for the commutation of the "Unrestricted Frequency Changer" (U.F.C.) with three-phase output, since this system has been shown to be most practical and economical in industrial applications. (For a broad definition of the Unrestricted Frequency Changer see in "Electronics Engineers Handbook", First Edition, 1975, McGraw-Hill Co., Section 15-42, page 15-52 under "Power Frequency Changers" by L. Gyugyi. A typical unrestricted frequency changer has been described in U.S. Pat. No. 3,170,107 of R. D. Jessee.)

There are basically three approaches to force commutation of the main thyristors of a cycloconverter:

1. Individual switch commutation (i.e., commutating each conducting switch separately),
2. Input line commutation (i.e., commutating all switches at the input lines),
3. Load commutation (i.e., commutating all switches at the load).

These approaches have relative advantages and disadvantages.

1. Individual Switch Commutation

Individual switch commutation provides for separate commutation of each switching element in the cycloconverter. Separate commutation of individual switches may be accomplished by two basic arrangements (as shown in FIG. 1 described hereinafter). The first arrangement consists in using for each switch two thyristors connected in antiparallel in the power path and in providing a commutating circuit in parallel thereto. The second arrangement (as shown in FIG. 2 described hereinafter) consists in having the power thyristor to be commutated mounted in the central branch of a rectifier bridge connected in the power path, and providing a commutating circuit in parallel thereto. A force commutated cycloconverter which is typical of a first mode of individual switch commutation applied to cycloconverters is disclosed in U.S. Pat. No. 3,302,093 of C. J. Yarrow issued Jan. 31, 1967. This circuit combines natural and force commutation depending on the voltage direction between the thyristor to be turned off. Force commutation is achieved in the Yarrow patent by adding only passive components to the basic cycloconverter. The operation is automatic, force commutation occurring at each required instant as a result of firing the next pair of antiparallel thyristors in sequence. This is an advantage. However, the voltage charging the commutating capacitors is determined by the difference between two instantaneous input voltages at the moment of firing. This difference may be small when the load current is large. Consequently, the commutating capability of the Yarrow circuit varies over the output cycle and it depends upon the load. This requires restricting the operating conditions in order to be able to maintain commutating ability. In a second known form of individual force commutation (as illustrated in FIG. 4 described hereinafter) firing pulses are applied to thyristors of a positive bank of thyristors when the load is positive, to the thyristors of a negative bank of thyristors when the load is negative, when the conditions are right so that natural commutation occurs; otherwise, force commutation is effected with commutating capacitors which are charged to some voltage prior to the instant of commutation. In contrast to the first form of individual force commutation the capacitors here do not follow the instantaneous voltage difference between phases but keep their maximum voltage. Therefore, the commutation capability of the second form of individual force commutation just mentioned is superior to the one of the Yarrow circuit previously mentioned. However, much higher ratings are required for the thyristors. Also, the commutating ability is still dependent upon operating conditions of the cycloconverter, which for this reason must be restricted accordingly.

A third form of individual force commutation applied to cycloconverters has been described by L. J. Ward and W. Sinclair in a paper entitled "Production of Constant Frequency Electrical Power for Aircraft Using Static Equipment," presented in 1962 at a joint conference in England of the Royal Aeronautical Society and the Institution of Electrical Engineers. (This circuit is illustrated in FIG. 5 hereinafter described). In such case, the main switching thyristors of the cycloconverter must always be force commutated. A capacitor is charged during conduction of one thyristor, discharged when the other is fired to turn off the first one and charged to a reverse polarity to turn off the second one. When the first thyristor is again fired, the capacitor is discharged and brought back to the original charge and polarity, ready for the next force commutation. With this arrangement the number of main cycloconverter thyristors and commutating capacitors is halved by comparison to the previous form of individual commutation. However, this circuit is also load sensitive. There is also the inconvenience of reversing the voltage of the commutating capacitor for the next commutation, since it entails two operations of the discharge circuit for one conduction interval. This increases the losses and the rating of the thyristor.

More generally, the above-mentioned three circuits of the prior art have in common the disadvantage that their commutation capability is load dependent. Therefore, for a reliable operation under all conditions, additional components are required.

2. Input Line Commutation

With this type of commutation a commutating circuit is connected, as illustrated in FIGS. 6 and 7 described hereinafter between the phase lines of the power source, for a cycloconverter in a Bridge or Wye configuration. To commutate, it is necessary that the commutation circuit decrease the input line voltage to the thyristor to be turned off below the line voltage to the thyristor to be fired.

At each commutation instant the voltage of the input line feeding the conducting "outgoing" thyristor must be forced to drop below that of the line feeding the "oncoming" thyristor. If one considers a three phase cycloconverter it is clear that each output phase should be treated as a separate single-phase unit and that the inputs to each unit be isolated from the others to prevent undesirable interaction of the commutation circuits. In general, such operation is not desired. Input line commutation requires that either separate commutating circuits be provided for each input line, or that several common commutating circuits be used and connected appropriately to each input line by "steering" thyristors.

3. Load Commutation

One typical known mode of load commutation with cycloconverters provides full commutating capability under all operating conditions. A single commutating circuit achieves commutation of all main thyristors for one phase, thus giving a good utilization of commutating components.

It appears from the preceding enumeration of the three basic arrangements for a forced commutation cycloconverter that in both individual and input line commutation, the commutation pulse is applied at a separate point for each main thyristor. This requires many individual commutating circuits. Also for a reliable operation, independent from load current and instantaneous voltage levels, each individual commutating circuit would have to include many components, the total number of which would be excessive.

With load commutation however, the commutation pulse is applied at a point common to a number of main thyristors, and the number of separate commutation circuits required is therefore reduced. With the number of commutating circuits and thyristors reduced the basic control can also be simpler. The present invention makes generally use of this third approach to commutation, and therefore affords the advantages derived therefrom. However, this particular approach does not exclude the use of the input line commutation approach whenever the cycloconverter is used in a condition of reverse flow of power for a particular application, for instance in an aircraft electrical plant which can be used both in flight with the engine as the source of power and on the ground with a local source of power for the purpose of starting the engine, the alternator coupled to the engine being the load in the later instance.

One object of the present invention is to provide an unrestricted static frequency changer system of improved capability through the use of forced commutation.

Another object of the present invention is to provide an improved force commutated cycloconverter of the type using load commutation.

Still another object of the present invention is to provide a cycloconverter of the force commutation type using directly a commutating capacitor in conjunction with the switches of the cycloconverter.

A further object of the present invention is to apply direct capacitor force commutation to a cycloconverter.

One object of the invention is to provide force commutation in cycloconverter which is independent from load conditions.

An additional object of the present invention is to provide a cycloconverter of the force commutation type which is free from the usual restrictions of operation for commutating capability.

SUMMARY OF THE INVENTION

The invention provides for an improved force commutated static frequency changer in which a predetermined voltage is applied directly via auxiliary controllable rectifiers to create an effective reverse voltage to commutate the conductive main controllable rectifier among a group of main rectifiers having the same relation to the load for each phase. Force commutation is applied to all main rectifiers of such a group without regard whether or not commutation can be achieved naturally while the rectifiers are cyclically and temporarily controlled for conduction under the polyphase alternating current input. The predetermined voltage is derived from a precharged capacitor which is discharged when applied to the main rectifiers while establishing a temporary path for the load current while the conductive main rectifiers die out before a take over of the next main rectifiers fired for conduction. The load current recharges the capacitor to the same predetermined voltage but in the opposite polarity, which is thereby ready for operation with regard to the main rectifiers of another group having a common but opposite relation to the load for each phase. A force commutation is associated with each bank of the frequency changer or certain of the functions for commutation may be carried in common for different banks of main rectifiers. The force commutation can be inserted and duplicated within several arrangements of rectifiers in order to accommodate a minimum of element functions. It can be used with a neutral connection to the alternating current source and such neutral connection can be artificially created by using a Wye configuration arrangement with several capacitors equally distributed among the input phases.

The force commutation circuit is preferably connected on the load side relative to the main controllable rectifier. However, operation on the input side of the static frequency changer is contemplated whenever the latter is utilized with a reverse direction of power flow as may be desirable for certain applications. For instance, it is anticipated that the static frequency changer according to the present invention may be used on board of an aircraft to convert the alternating current supply of the alternator driven by the engine from say 1200 Hz down to 400 Hz as usual on board of an aircraft. When on the ground the 60 Hz utility supply could be used and converted in frequency by the same equipment up to say 800 Hz in order to start the engine.

BRIEF DESCRIPTION OF THE DRAWINGS

FIGS. 8 and 9 are typical of load commutation, FIG. 8 for a Wye configuration while FIG. 9 is typical of load commutation for the bridge configuration;

REVIEW OF FORCE COMMUTATION SYSTEM FOR CYCLOCONVERTERS OF THE PRIOR ART

A. Individual Switch Commutation

Figure 1:
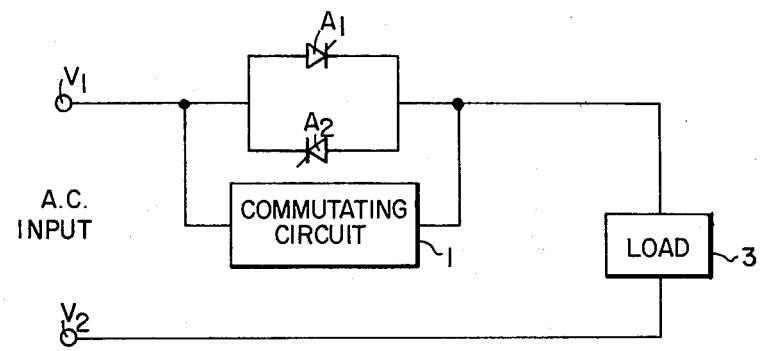
FIGS. 1 and 2 represent two basic arrangements of the prior art for individual switch commutation.
Figure 2:
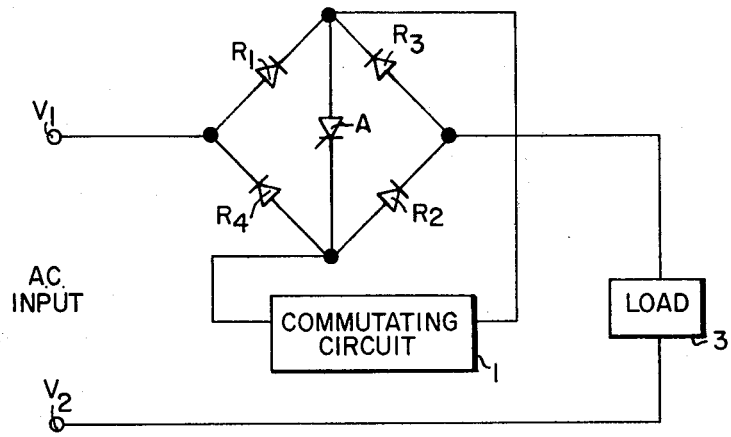

FIGS. 1 and 2 show two basic arrangements for Individual Switch Commutation. In FIG. 1, a commutating circuit 1 is connected in parallel to two thyristors $A_1$, $A2$ mounted in antiparallel in the power path between the power source, $V_1$, $V_2$ and a load 3. FIG. 2 shows a commutating circuit 1 associated with a thyristor A connected in the central branch of a rectifier bridge comprising rectifiers $R_1$ to $R_4$ and mounted in the power path between the power source $V_1$, $V_2$ and a load 3.

Figure 3:
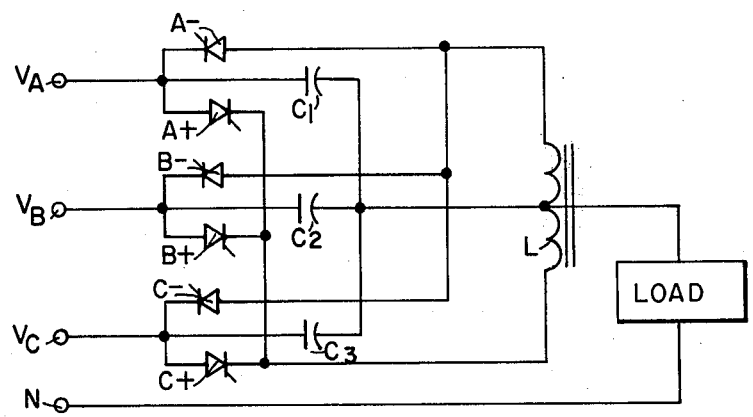
FIGS. 3, 4 and 5 represent three prior art circuits illustrative of individual switch commutation of a cycloconverter.

FIG. 3 illustrates the force commutation circuit which is typical of the above-mentioned Yarrow arrangement. The thyristors are gated on in pairs and continuous drive is provided. It is seen that under appropriate conditions the circuit commutates "naturally." For example, assume thyristor A+ is ON and the phase voltages are such that $V_B > V_A > 0$. Then upon firing the second thyristor pair (B+, B−), thyristor A+ will turn off and thyristor B+ will take over conduction. When the conditions for natural commutation are not met, for instance assumming A+ is ON and the phase voltages are such that $V_A > V_B > 0$, upon firing the second thyristor pair (B+, B−) a conducting path is established between phases A and B via thyristors A+ inductance L and B−. However, at this time capacitor C2 is charged to $V_{C2}$ (right hand plate positive) while C1 has no charge ($V_{C1} = 0$). As thyristor B− turns ON, voltage $V_{C2}$ is impressed on the upper winding of inductor L. The induced voltage in the lower winding of the inductor appears across thyristor A+ with a polarity to turn it off. Since positive current was initially assumed (A+ was conducting) after the commutation transient (when the resonant current becomes equal to the load current) thyristor B+ will take over conduction.

Force commutation is achieved here by adding only passive components to the basic cycloconverter. Operation is automatic, forced commutation occurring at each required instant as a result of firing the next thyristor in sequence. However, since the voltage on the commutating capacitors is determined by the instantaneous difference between two appropriate input voltages, at the moment of firing, this difference may be small when the load current is large. Consequently, the commutating capability of the circuit varies over the output cycle and is dependent on the load. Therefore the operating conditions must be restricted so that sufficient commutating ability is always retained.

Figure 4:
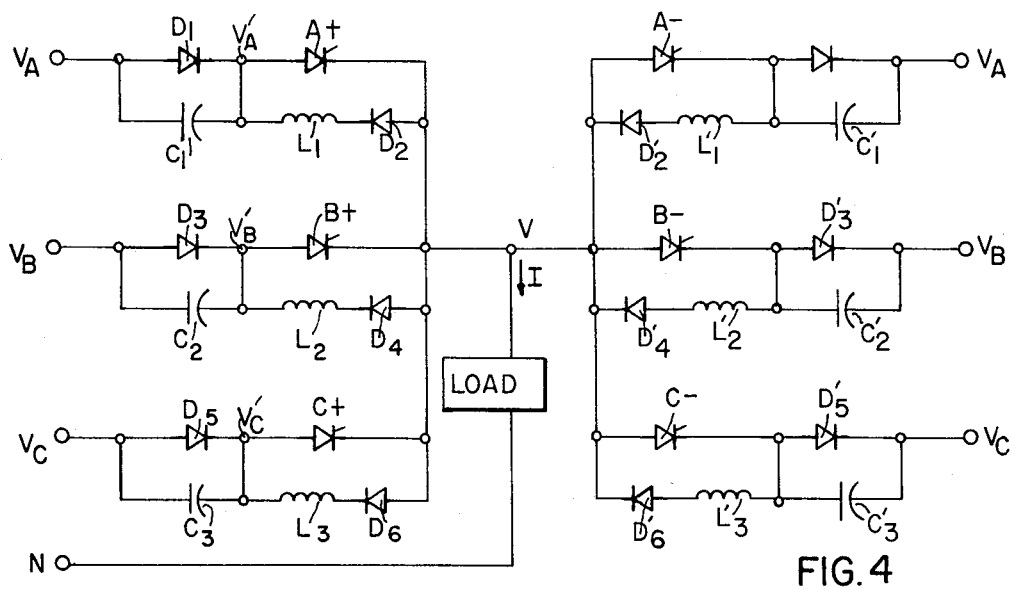

FIG. 4 depicts a force commutation circuit of the above-mentioned second mode of individual switch commutation where one load is energized from a positive and a negative bank underphases $V_A$, $V_B$, $V_C$ of the power supplies, with a neutral line N. Firing pulses are applied to the thyristors of the "positive bank" when the load current is positive; the thyristors of the negative bank are fired when the load current is negative. When conditions are right the circuit operates with "natural commutation," for instance, assuming thyristor A+ is ON, and with a current $I_0 > 0$, the phase relation is $V_B > V_A > 0$. Then, firing thyristor B+ will effectively turn off thyristor A+.

Force commutation is based upon the principle that the commutating capacitors are charged to some (maximum) voltage prior to the instant of commutation. The capacitors, in contrast to the preceding circuit do not follow the instantaneous voltage difference between phases but keep their "maximum" voltage.

Assuming now that while thyristor A+ is ON the phases have the relation $V_A > V_B > 0$. It is obvious that if capacitor C2 were to hold no charge (or without C2), thyristor B+ could not be rendered conductive. However, during the conduction intervals of thyristor C+ and thyristor A+, $V_O$ the potential at the junction of the banks to the load has been more positive than $V_B$ and thus capacitor C2 has been charged through diode D4 and inductor L2 to a potential of 2 ($V_O - V_B$). The charge thus acquired on C2 is preserved when $V_B$ becomes greater than $V_O$, because the discharge path is blocked by D3 and D4. Therefore $V_B'$ becomes greater than $V_B$. When thyristor B+ is fired ($V_A > V_B$), the sum $V_B + V_{C2} = V_B'$ must be greater than $V_A$ to insure commutation. This condition is assumed to be generally satisfied.

The commutation capability of this circuit is greater than the preceding arrangement because of the preserved maximum charge of the commutating capacitor. However, considerably higher voltage ratings are required for the thyristors employed in this circuit. Also, the commutation ability here is still dependent on operating conditions which must be suitably restricted.

Figure 5:
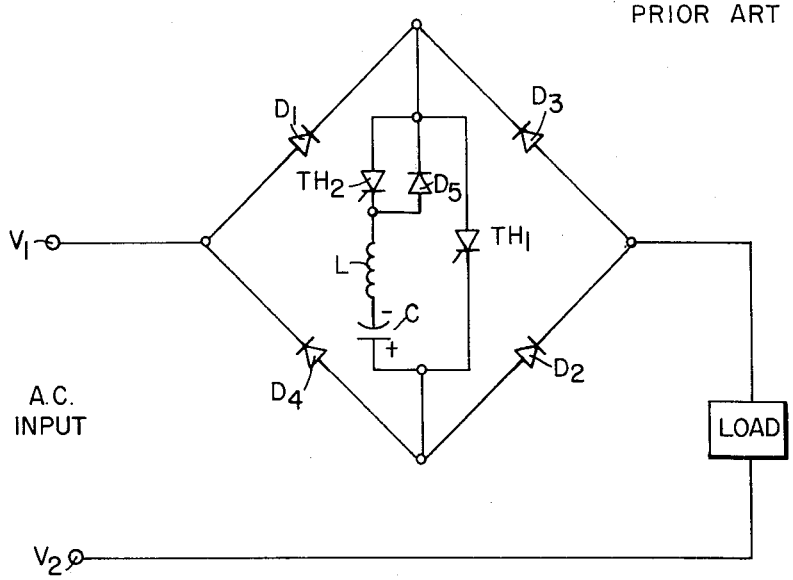

FIG. 5 shows the third above-mentioned known arrangement of individual switch commutation.

In this arrangement the main switching thyristors of the cycloconverter must always be force commutated. The operation of this circuit can be understood by assuming that thyristor TH1 is conducting and capacitor C is charged as indicated (top plate negative). When thyristor TH2 is fired, capacitor C starts to discharge via thyristor TH2, inductor L and thyristor TH1. Thyristor TH1 turns off and current continues to flow via rectifiers D2, D4 and D1, D3. The capacitor C becomes charged to a voltage of reverse polarity and TH2 turns off. When TH1 is fired the next time in the normal operating sequence, C discharges via D5 and L; its voltage assumes the original polarity (shown in FIG. 5) and the circuit is ready for the next commutation.

With this arrangement, the number of main cycloconverter thyristors and commutating capacitors is halved, compared to the preceding circuit. This results in slightly bettern component utilization. However, this circuit is also load sensitive. It is clear that as soon as TH1 turns off, the load current (assuming an inductive load) will continue flowing via D2, D1 (or D4, D3) and the commutating circuit. The final charge on C is therefore dependent upon the load current. The other disadvantage is that the polarity of the capacitor voltage must be reversed for the next commutation (i.e., the LC circuit must be operated twice for each conduction interval of TH1). This increases the losses within the commutation circuit and also the rating for TH1.

Beside specific disadvantages the above circuits have a common disadvantage in that their commutation capability is load dependent. Therefore, for reliable operation under all conditions additional components would be required.

B. Input Line Commutation

Figure 6:
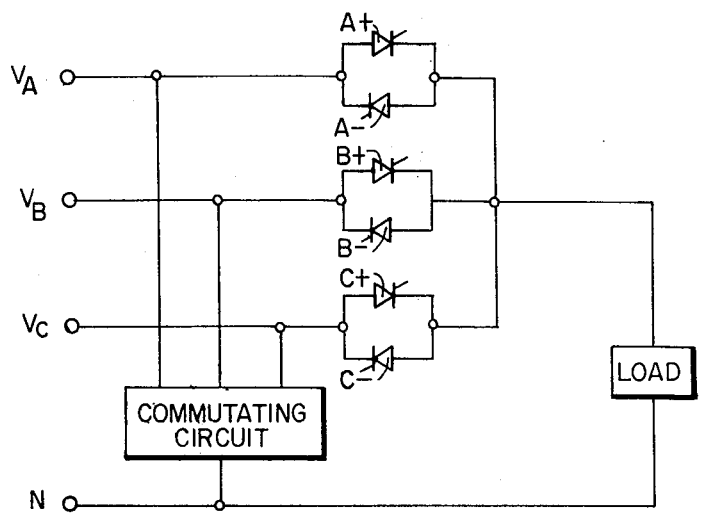
FIGS. 6 and 7 show two basic arrangements of the prior art for input line commutation, one for the Wye configuration (FIG. 6) the other for the bridge configuration (FIG. 7)
Figure 7:
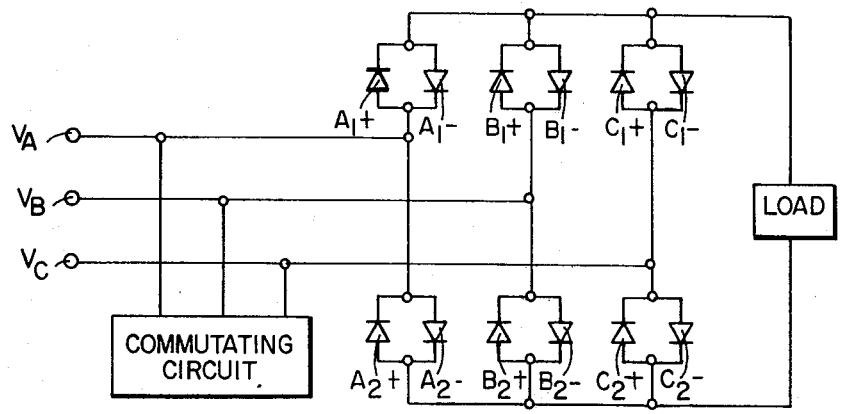

Basic input line commutation arrangements for a cycloconverter in a Bridge or Wye configuration are shown in FIGS. 6 and 7 respectively. The operation of the commutation circuit in each arrangement is basically the same. Consider for the sake of discussion the Wye configuration (FIG. 6) and assume thyristor A+ is conducting and the phases are in the relation $V_A > V_B > 0$. Suppose now that one wished to turn B+ ON and commutate thyristor A+ OFF.

To commutate thyristor A+ OFF, it is necessary that the commutation circuit decrease the input line voltage, $V_A$, below $V_B$ in order to reverse bias thyristor A+. Similarly at each commutation instant the voltage of the input line feeding the conducting "outgoing" thyristor must be forced to drop below that of the line feeding the "oncoming" thyristor. If one considers a three phase cycloconverter it is clear that each output phase should be treated as a separate single-phase unit and that the inputs to each unit be isolated from the others to prevent undesirable interaction of the commutation circuits. In general, such operation is not desired. Input line commutation requires that either separate commutating circuits be provided for each input line, or that several common commutating circuits be used and connected appropriately to each input line by "steering" thyristors.

For the above reasons it is felt that any technique based upon input line commutation will require an excessive number of components and, therefore, this approach was not investigated any further.

C. Load Commutation

Figure 8:
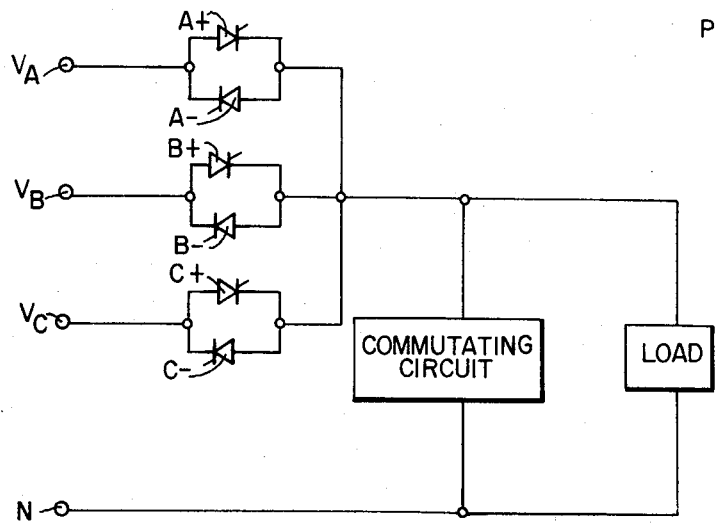
Figure 9:
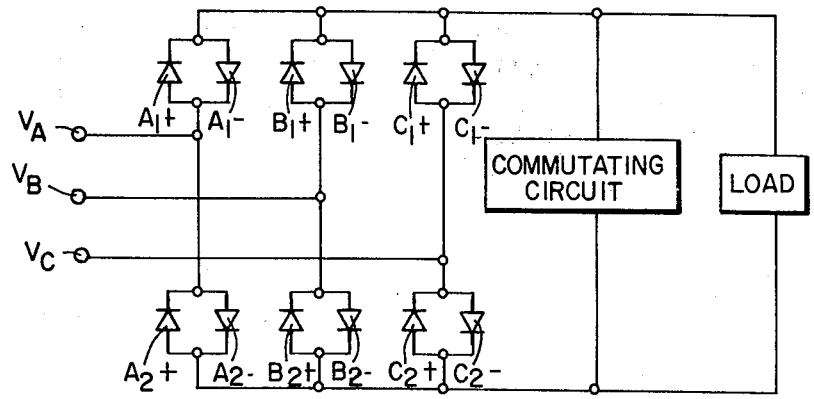

Basic load commutation arrangements for a cycloconverter in Wye and Bridge configurations are shown in FIGS. 8 and 9, respectively.

Figure 10:
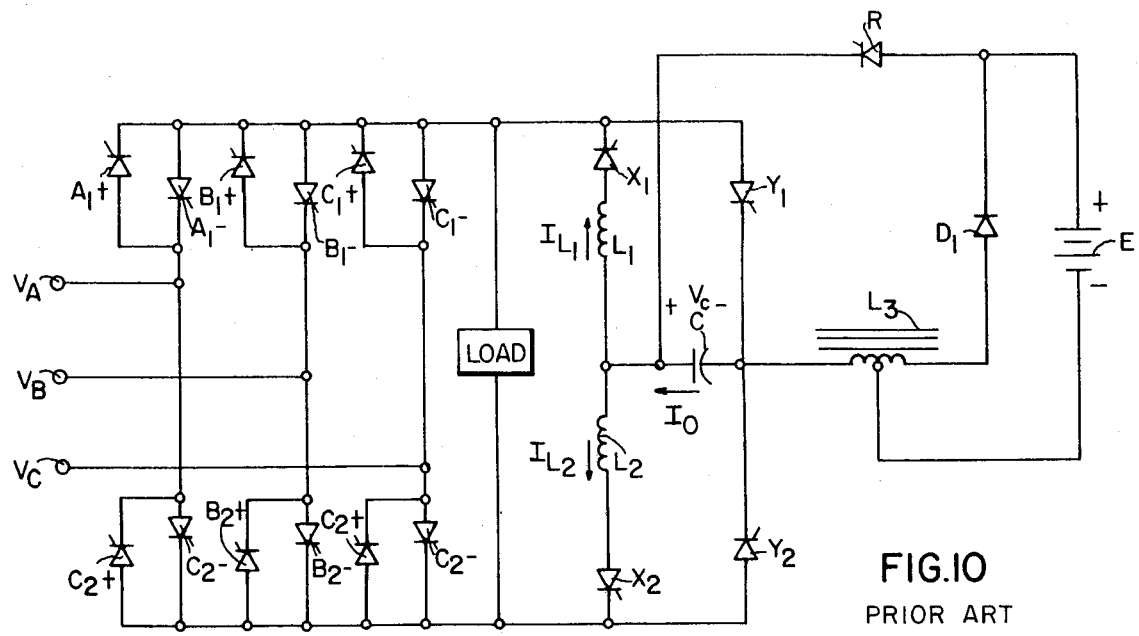
FIG. 10 shows a prior art circuit which is typical of load commutation of a cycloconverter, and FIG. 11 provides the curves illustrating operation of the circuit of FIG. 10.
Figure 11:
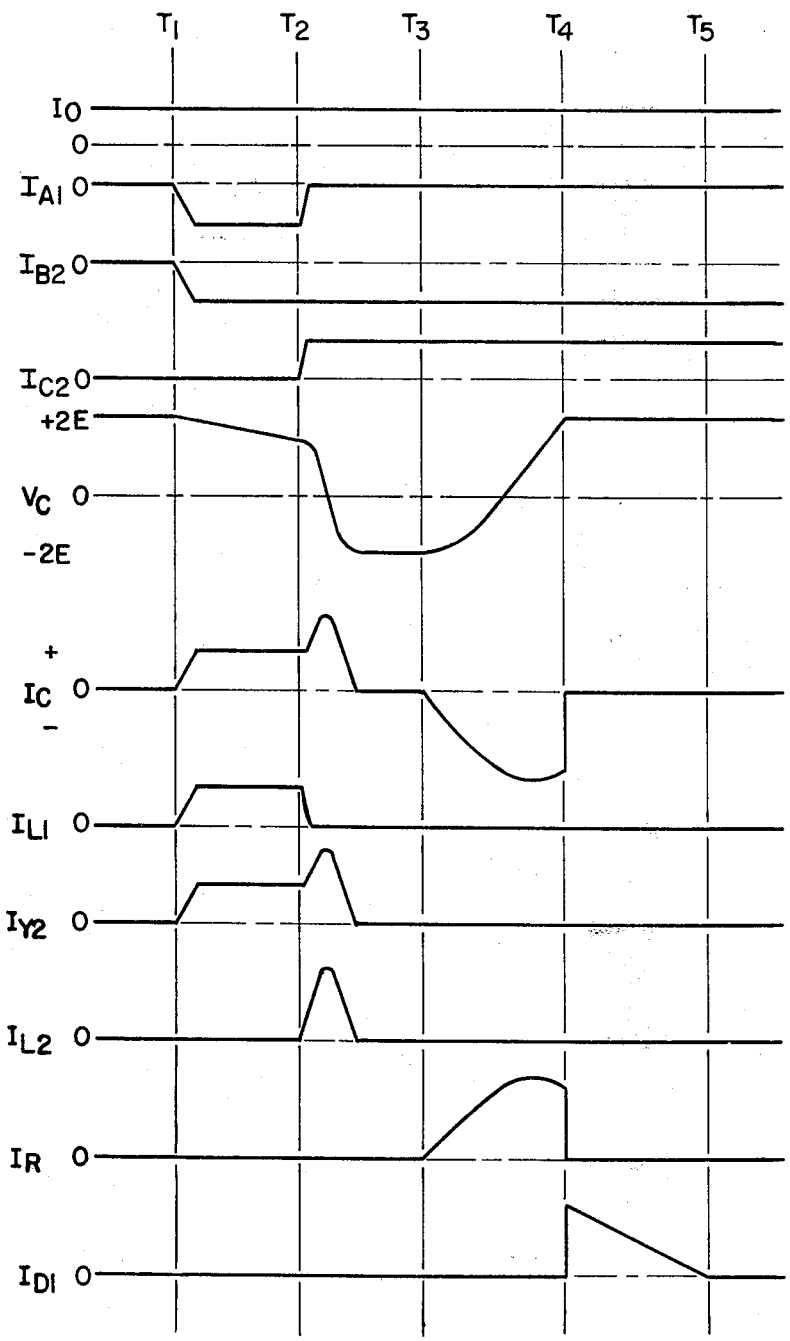

FIG. 10 shows a known circuit which is typical of load commutation. This circuit has been described by L. Gyugyi in "A Study on the Application of the Force Commutated by Cycloconverter for Variable Speed Control of A. C. Machines" M. Sc. Thesis — University of Pittsburgh, 1967. The operation of this circuit is illustrated by the waveforms shown in FIG. 11. It is assumed that the load current ($I_o$) is positive and that its magnitude remains constant throughout the commutation interval, that an initial voltage $V_c$, greater than the peak line to line voltage, is present on capacitor C with the polarity as indicated, and that thyristors A1+ and B2+ are conducting when commutation from thyristors B2+ to thyristor C2+ is to be effected.

To initiate commutation, auxiliary thyristors $X_1$ and $Y_2$ are fired at time T1. Thyristors A1+ and B2+ are reversed biased and turned off. The load current continues to flow via $X_1$, $L_1$, C and $Y_2$, and begins to discharge capacitor C.

After sufficient time for recovery of the main cycloconverter thyristors, at time T2, the next thyristors in sequence, A1+, A1— and C2+, C2— are fired. Since a positive load current is assumed, thyristors A1+ and C2+ will conduct placing $V_{A-C}$ across the load. At this time thyristor $X_2$ is also fired causing the current in $L_1$ and $X_1$ to decrease to zero. Therefore, $X_1$ turns off, while the current in $L_2$ and $X_2$ resonantly builds up. Due to this resonant current flowing in $L_2$, $X_2$, $Y_2$ and C, the voltage on C is therefore reversed. The firing of $X_2$ is important because it ensures than now the original state of the circuit can be re-established due to the action of a "clamped resonant recharging circuit," independently of the load. Firing $X_2$ insures that the voltage on C will be of opposite polarity (negative) prior to firing thyristor R. Under this condition the recharging circuit consisting of thyristor R, diode D1, inductor L3 and the DC supply E can restore the original voltage of the commutating capacitor.

At time T3, thyristor R is fired. Since the voltage on C has been reversed (bottom plate positive), the capacitor starts to charge resonantly to a voltage higher than 2E. The voltage across the left hand side winding of L3 cannot however increase above E because at this voltage, diode D1 starts to conduct. The energy stored in L2 therefore ceases to charge C any further and thyristor R turns off at time T4. The remaining energy stored in L3 is then fed back to the DC supply, it decays to zero at time T5. The final result is that the commutation capacitor is now charged back to the original potential (2E). The circuit is now ready for the next commutation.

Operation of this circuit is such that the full commutating ability is always available independent of the operating conditions, and a good utilization of commutating components is achieved since a single commutating circuit achieves commutation of all main thyristors (in a single phase system).

It is recalled in both individual and input line commutation, that the commutation pulse was applied at a separate point for each main thyristor of the cycloconverter. This requires that many individual commutating circuits be used. For this operation to be reliable, independent of load current and instantaneous voltage levels, each individual commutating circuit would have to comprise many components and the total number of commutating components would become excessive. With load commutation however, the commutation pulse is applied at a point common to a number of main thyritors, and the number of separate commutation circuits required is therefore reduced. With the number of commutating circuits and thyristors reduced the basic control can also be simpler.

THE BASIC FORCE COMMUTATION CIRCUIT OF THE INVENTION

Firstly, the commutation circuit according to the present invention belongs generally to the category load commutation, that is, force commutation is applied at the load or output side of the main cycloconverter thyristors. However, in view of the reversibility of operation of the cycloconverter, this may not be always true, when the force commutated cycloconverter is used under reverse power flow. In such case, the force commutating circuit according to the present invention would work as an input line commutation type.

Secondly, commutation is effected according to the present invention by a precharged capacitor, that is, a precharged capacitor is switched in at the appropriate moment to commutate OFF one main cycloconverter thyristor and assume conduction of the load current momentarily until the next thyristor in sequence can be turned ON.

These two features of the present invention will appear more clearly from the following description of the basic circuit and of several possible configurations of a cycloconverter so commutated will also be discussed in detail hereinafter.

Nearly all commutating circuits actually depend either directly or indirectly on the use of a precharged capacitor to effect force commutation. Many different circuit configurations are possible. However, only two approaches will be considered for switching directly precharged capacitors to the output side of groups of thyristors in a cycloconverter and effect commutation. The first approach applies capacitor commutation directly to the cycloconverter output and can be used for either "bridge" or "midpoint" connections. The second of these approaches makes use of a six-pulse midpoint connection, which combines the output of two three pulse groups of thyristors with an interphase transformer.

The present invention calls for direct capacitor commutation. This particular approach may not at first seem advantageous for cycloconverter operation. It will be shown later however, that it is ideally suited for certain types of three phase operation. To explain the principle of operation first will be considered the positive load current carrying section (positive bank), of a cycloconverter in the bridge configuration as illustrated in FIG. 12.

Figure 12:
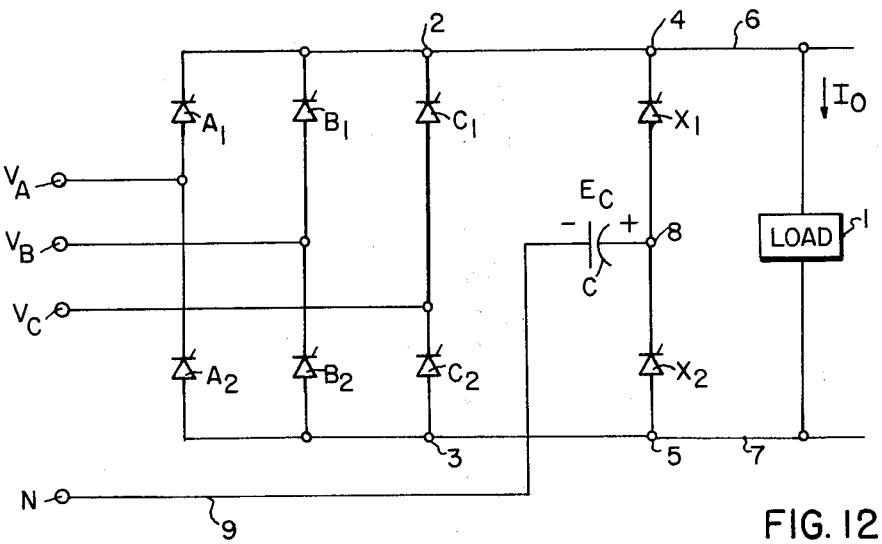
FIG. 12 shows the positive bank of a bridge cycloconverter with direct capacitor commutation in accordance with the present invention.

FIG. 12 shows the three input phases $V_A$, $V_B$, $V_C$ of a positive bank of a cycloconverter in the bridge configuration. The main thyristors are $A_1$, $B_1$, $C_1$ and $A_2$, $B_2$, $C_2$ for the respective input phases $V_A$, $V_B$, $V_C$. A commutating capacitor C is connected to each line 6, 7 leading to the load 1 via steering thyristors $X_1$, $X_2$, having a common junction point 8. Capacitor C is also connected via line 9 to the neutral N of the AC power source. This portion of the overall cycloconverter may be regarded as a force commutated converter or "inverter". The conduction sequence of the main thyristors is such that they conduct for one third of the time, and are commutated in the sequence: A1, C2, B1, A2, C1, B2, A1, and so on. It may be observed that the upper thyristors (index$_1$) and the lower thyristors (index$_2$) are commutated alternately.

Consider the instant for commutation of thyristor A1, at this time thyristor C2 will also be conducting. Assume that initially the capacitor C is charged with polarity indicated to a potential $E_C$ having a magnitude greater than the peak input line to neutral voltage of the cycloconverter AC source. Assume also that throughout the commutation interval the output current ($I_o$) remains essentially constant. Force commutation of thyristor A1 will be required if the "incoming" voltage to the next thyristor in sequence, B1, is more negative than the "outgoing" voltage of the conducting thyristor A1 (i.e., if line B is negative with respect to line A). Force commutation of A1 is accomplished by firing X1. The voltage $E_C$ of the capacitor C is applied at the junction 2 of all thyristors of the same index group. At this instant the difference in potential between the voltage of capacitor C and line voltage $V_A$ of the pulse appears as a reverse voltage across thyristor A1, causing it to cease conducting. The output current ($I_o$) continues to flow through thyristor X1 and capacitor C, charging C linearly (see AB on FIG. 14) to a voltage of opposite polarity. At the instant when the capacitor charge is fully reversed (i.e., its voltage reaches $E_C$ with polarity opposite to that indicated) the next main thyristor in sequence, B1, is fired causing X1 to drop out of conduction, and the capacitor is now charged in the opposite direction and ready to accomplish commutation of the next thyristor in sequence (C2). This will be accomplished by firing thyristor X2. After commutating C2, the DC current will again charge C, changing the polarity of its voltage back to that shown in FIG. 14. The circuit is again ready to commutate the next thyristor in sequence.

As seen, the commutation of upper and lower devices can be accomplished alternately, because the output current $I_o$ reverses the charge on the commutating capacitor C at each commutation.

Figure 13:
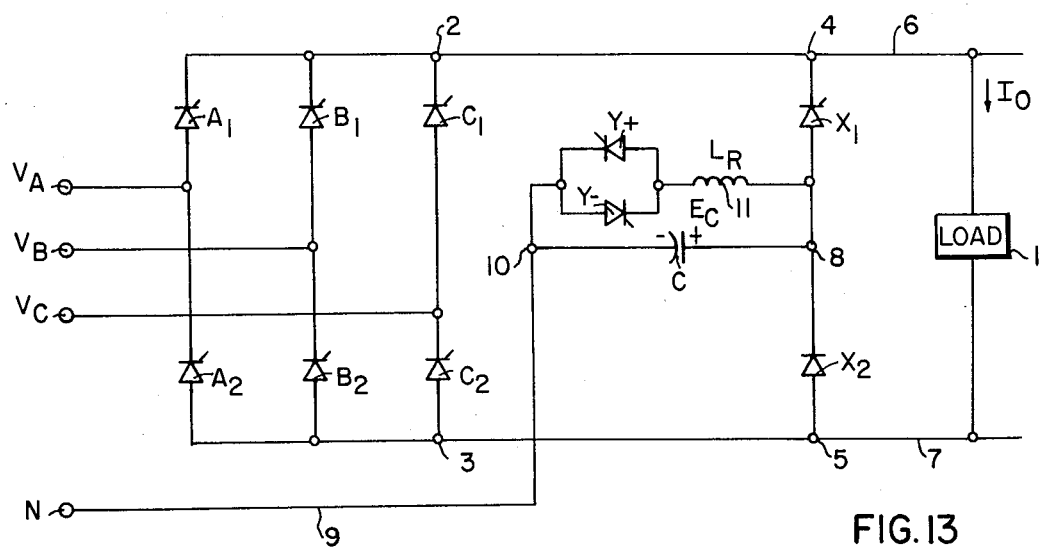
FIG. 13 is the circuit of FIG. 12 improved by the presence of a resonant reset circuit.
Figure 14:
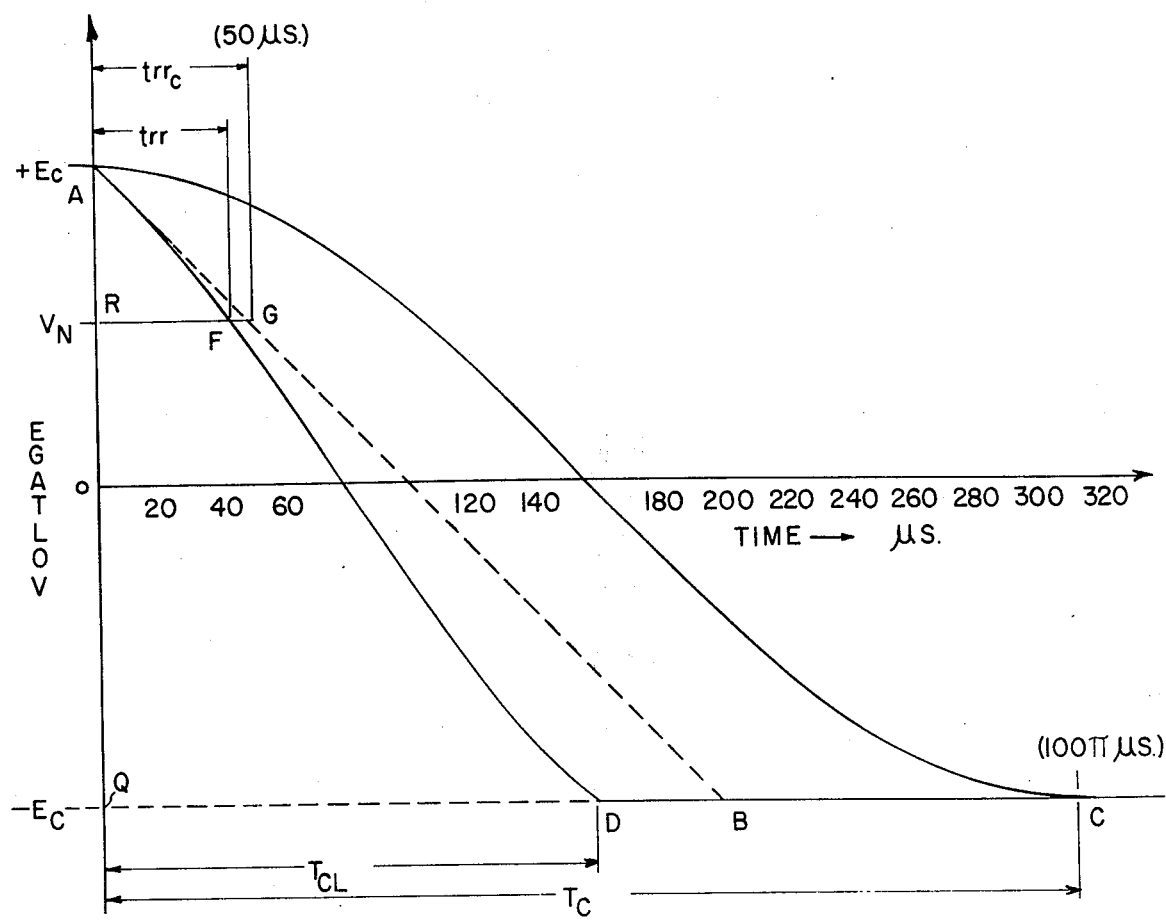
FIG. 14 depicts with curves the effect of the resonant reset circuit of FIG. 13 on the operation of the circuit of FIG. 12.

In FIG. 14, $V_N$ represents the peak line to neutral voltage and G represents the operating point on the linear curve with a time $t_{rrc}$ for discharging the capacitor C when such voltage $V_N$ exists on the phase of commutation. While the linear curve AB is chosen as typical for the full load, for line load currents the operating light would have less slope. Therefore, with reduced load currents the capacitor C will take longer times to reverse its polarity. For this reason the basic scheme would seem at first to be suitable only for a limited range of load currents, e.g., those not too much less than the magnitude characterizing AB of FIG. 14, thereby to maintain the output current above the critical level below which time such as $t_{rrc}$ would be too large for a proper fabrication of the basic cycloconverter waveform. In coping with this particular problem the present invention offers a unique feature: two auxiliary thyristors Y+ and Y− and an inductor $L_R$ forming together a "resonant reset" circuit are added as shown in FIG. 13. The function of the additional inductor $L_R$ and the thyristors Y+ and Y− is to provide a means of resonantly reversing the charge on the capacitor in the case of light load current. Besides this, the operation of the circuit is essentially the same as explained by reference to FIG. 12. For zero DC current, there will no longer be a line AB parallel to the time axis (see FIG. 14). Even with zero DC current the capacitor will have its charge reversed in a definite time (as shown by curve AC of FIG. 14) $\pi \sqrt{L_R C}$ seconds. If thyristor Y+ is fired at the same instant as X1, and Y− is fired with X2, the resonant reversal is initiated at the same instant as the commutation. The firing of Y could be delayed with respect to the firing of X, in which case a smaller value of $L_R$ could be used, but this would result in higher currents in the commutating components without giving any great benefit. By choosing $L_R$ appropriately the load dependent change in capacitor charge reversal time can be kept relatively small without introducing any appreciable loss of the capacitor commutating ability. This is illustrated by the curves of FIG. 14. Referring to line AB (maximum load current) of FIG. 14, it thus appears that resonant reset circuit introduced by inductor $L_R$ with capacitor C charged line AB to curve AD. The effect is more typical with lesser loads. Thus, while for no load line AB would become horizontal on the A level of the voltage ordinate still, the resonant reset circuit would cause a curve following AC to be imposed for charging capacitor C. A typical maximum charging time $t_c$ for no load would be $100\rho\mu S$ in a case as shown by FIG. 14, where F indicates a circuit commutation time of $40\mu S$, and for a value of $L_R$ chosen such that $I_{DC}$ (the maximum load current to be commutated) is equal to $= E_c \sqrt{(C \cdot L_R)}$ (e.g. the peak linkage current flowing for no load will correspond to the full load circuit current to be commutated). Although this circuit will commutate even with zero load current, the commutating energy available at each sequential commutation would become gradually smaller. This however would not necessarily be a problem, providing that the average load current corresponding to each "bank" of the cycloconverter can be maintained at a sufficient level. It will be shown later that with certain three phase configurations operating under balanced full load conditions, the commutating circuit according to the present invention will see a virtually constant load current and can therefore be utilized with maximum efficiency.

CAPACITOR COMMUTATION ACROSS THE INTERPHASE TRANSFORMER BETWEEN GROUPS OF THYRISTORS OF A SYSTEM HAVING WYE CONFIGURATION

Figure 15:
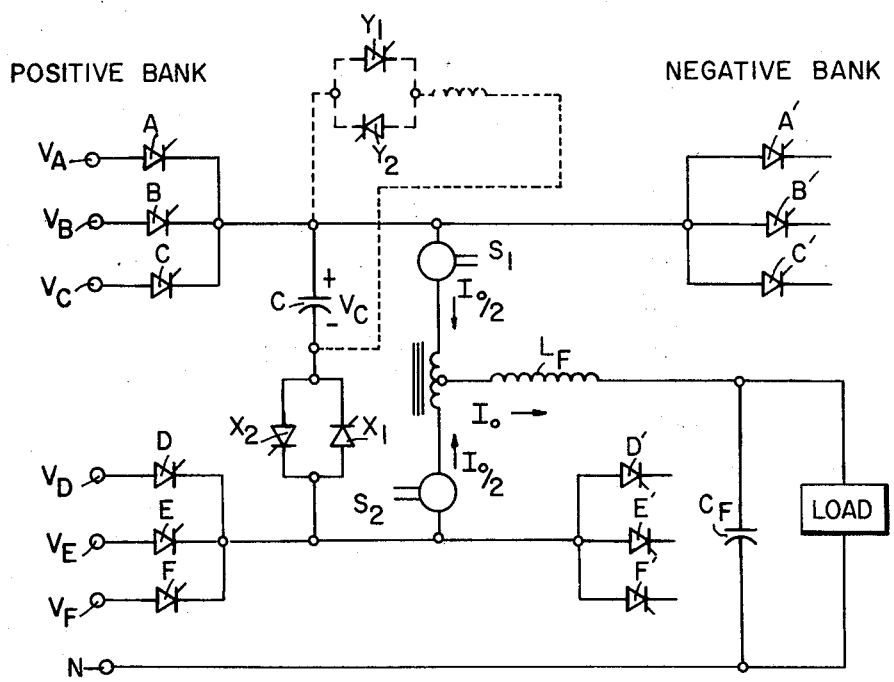
FIG. 15 shows commutation across the interphase transformer of a cycloconverter of that type.

To obtain a six pulse output with a Wye configuration it is advantageous (from the standpoint of thyristor utlization) to combine two, three-pulse groups of thyristors with an interphase transformer. For practical purposes it is usual to separate the positive and negative (current carrying sets of devices) "banks." A force commutating circuit according to the present invention as shown on FIG. 15 is applied to a positive bank. In this arrangement, each three-pulse group of thyristors A, B, C and D, E, F are commutated alternately so that at any instant two devices share the load current equally.

Assume thyristors A and D are conducting and that capacitor C is charged, with the polarity indicated, to a magnitude $V_C$, greater than the peak line to line voltage of adjacent phases. Assume further than the load current, $I_o$, does not change during the commutation interval. In order to commutate thyristor A, thyristor X1 is fired. The current which had been flowing in thyristor A is now furnished by the capacitor. The capacitor voltage thus begins to discharge linearly, eventually reversing its polarity. When the voltage across C reverses to a magnitude equal to its initial value, thyristor B is fired. The voltage across the capacitor C is now of suitable magnitude and polarity to commutate the next thyristor in sequence (thyristor D).

The rate of charge of the capacitor with this particular configuration is dependent upon the load current, which is not always desirable since the cycloconverter load current is essentially sinusoidal and the commutating capability with such configuration would not be maintained over the whole cycle in principle. However, this may be easily overcome by the addition of two more auxiliary thyristors (Y1 and Y2) and in inductor ($L_R$) as shown in dotted lines on FIG. 15, thereby to form a resonant circuit in response to charge reversals. The operation with such auxiliary components is as explained in the basic circuit of FIG. 13.

The invention has been discussed by reference to FIG. 15 in consideration of main switches ABC and DEF which belong to the positive bank of the cycloconverter. As generally known, a negative bank must also be considered as shown with main switches A'B'C' and D'E'F' and the commutating circuit according to the invention can be discussed exactly in the same terms as for the positive bank. The cycloconverter techniques are generally applicable in accordance with the known art. For instance, although this is not shown on FIG. 15, it is understood that a control circuit exists for firing the main switches in sequence and in accordance with a predetermined pattern to cyclically and temporarily control the main switches for conduction. In so doing, in accordance with the present invention, the control circuit must take into account the polarity of the current, since there is a clear relation between forward voltage of a thyristor-type of switch and the direction of flow of the load current, for proper commutation. With that purpose in mind a crossover current sensing device, such as $S_1$ and $S_2$ on FIG. 15 is provided in order that appropriate operation of the commutation circuit can be implemented with regard to the polarity of the load current.

The preceding comments apply in the same terms to the other configurations known for a cycloconverter, and especially to the particular configurations considered hereinafter as most appropriate in applying the forced commutation circuit according to the present invention.

SINGLE PHASE CONFIGURATION

Figure 16:
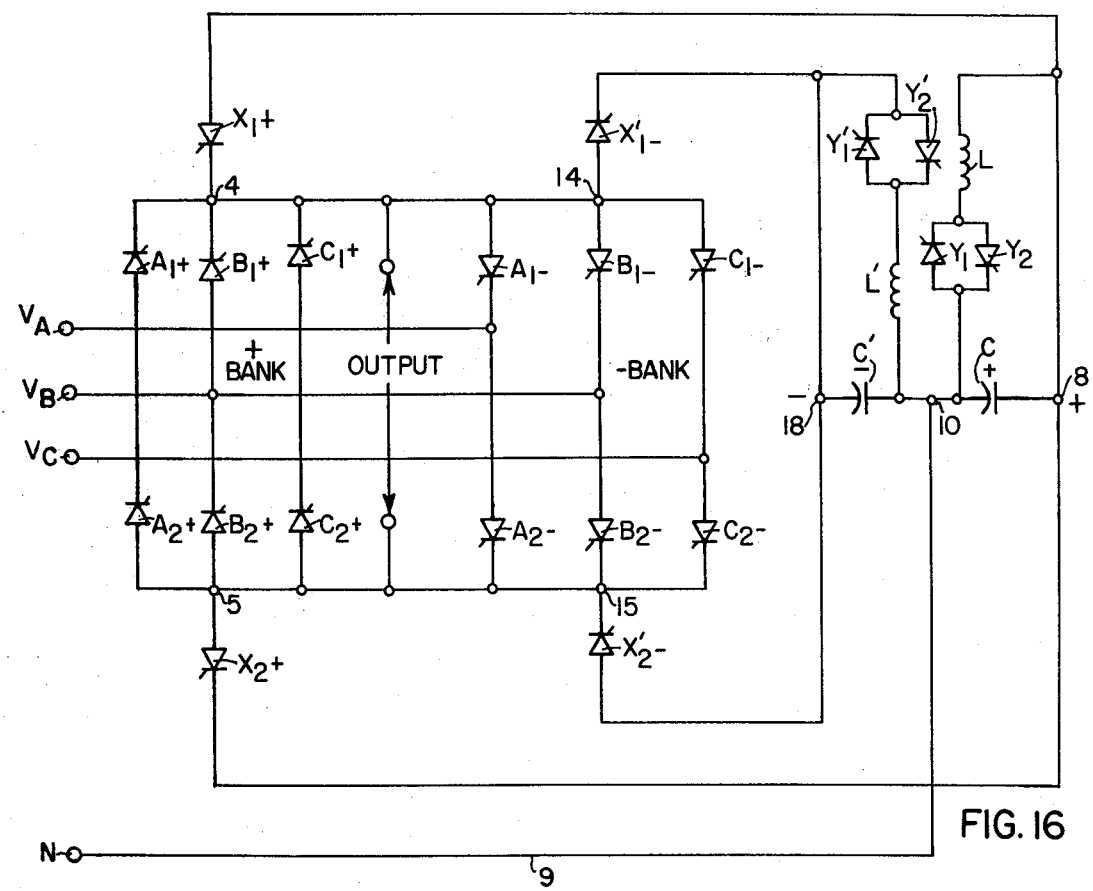
FIG. 16 shows a single phase, bridge connected, cycloconverter with direct capacitor commutation in accordance with the present invention.

A single phase configuration is shown in FIG. 16. Each bank has its own commutation capacitor, thyristors and auxiliary charge reversing components. Thus, auxiliary thyristors $X_1$ and $X_2$ with capacitor C and optionally a reset circuit including inductor L and thyristors $Y_1$, $Y_2$ are associated with the positive bank. Also auxiliary thyristor $X'_1$, $X'_2$ with a capacitor C' and optionally a reset circuit including inductor L' and thyristors $Y'_1$ and $Y'_2$ are associated with the negative bank. From the common point $L_0$ between the two capacitors C, C', is connected the neutral point via line 9. The commutating voltage is applied to points 4 or 5 for the two opposite groups of main thyristors within the pairs of the positive bank. Similarly, the commutating voltage is applied to points 14 and 15 for the two opposite groups of main thyristors within the pairs of the negative bank. This division between components is required because the current in each bank is discontinuous and of varying amplitude. Since each bank conducts only in every other half cycle, care must be taken to establish for each half cycle the correct firing sequence for the relevant commutating thyristors.

THREE PHASE CONFIGURATION

The three phase configuration is considered the preferred embodiment of the force commutation circuit according to the present invention.

Figure 17:
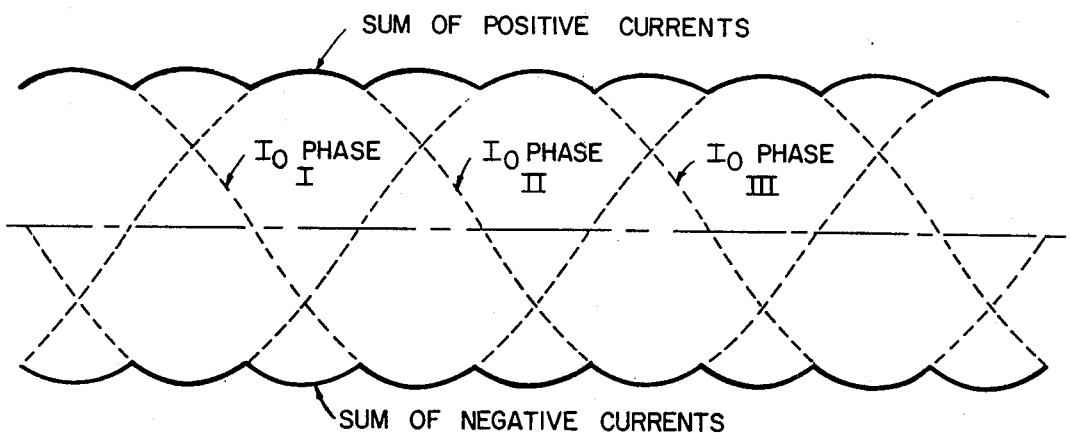
FIG. 17 shows typical output currents of a three-phase balanced load in a cycloconverter.
Figure 18:
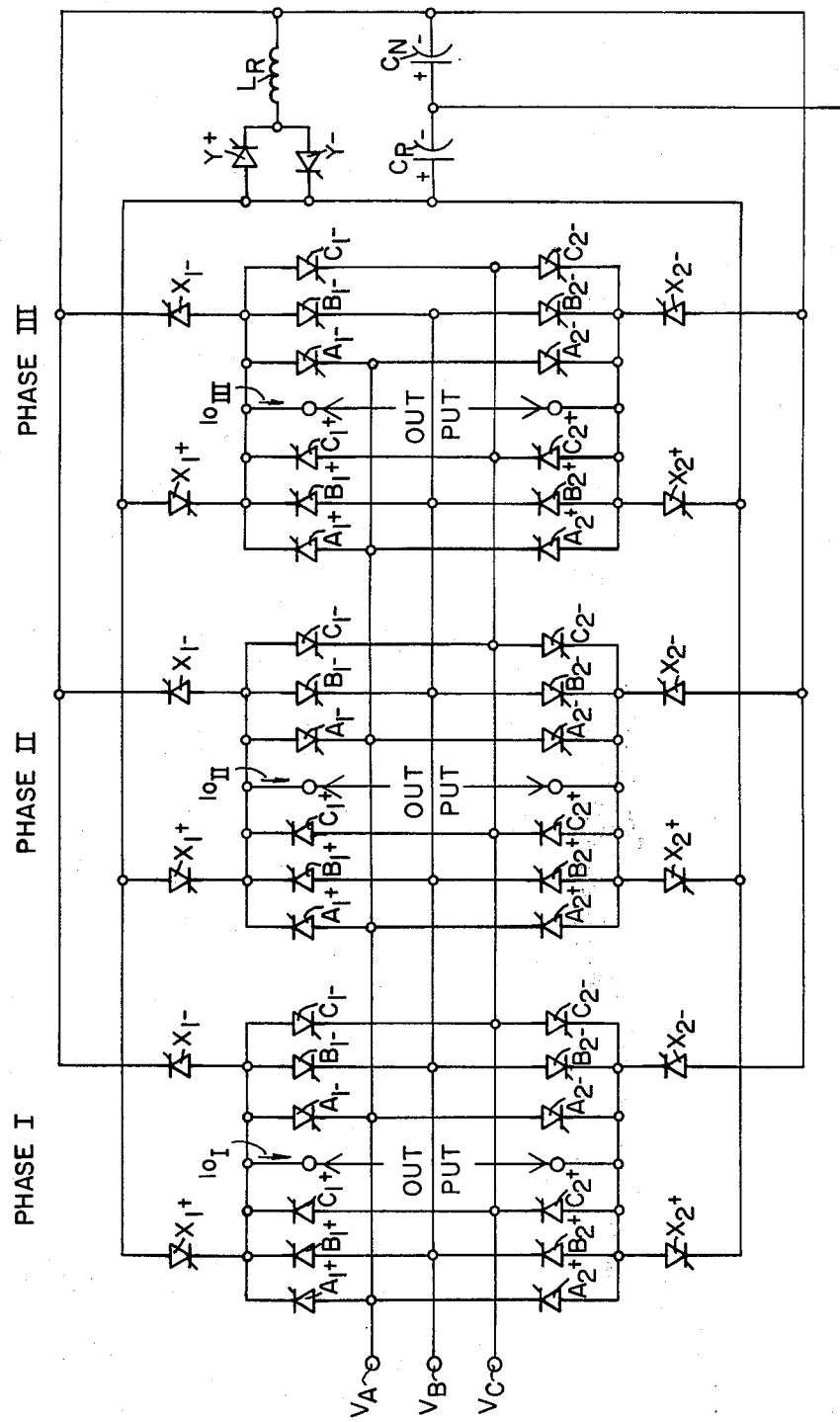
FIG. 18 illustrates a three-phase bridge cycloconverter with two capacitors and one resonant reset used in the context of direct capacitor commutation.

For the special case of three phase "Unrestricted Frequency Changer" (U.F.C.) type of operation with balanced loading, considerable circuit simplification and a very effective use of the commutating components can be achieved. The reasons for these improvements may best be understood by first considering the relationship between three balanced sinusoidal cycloconverter output currents, as illustrated in FIG. 17. At any instant the sum of the currents which are positive, is equal in magnitude to the sum of the currents which are negative. These "sum" currents (heavy lines) are relatively constant and do not exceed the magnitude of a single phase output current (dashed lines). Now when U.F.C. type cycloconverter operation is used, commutations occur simultaneously in the three output phases. Therefore, it is possible to design a commutating circuit using only two capacitors (having the same values as would be required for single phase operation) to commutate all three output phases as illustrated in FIG. 18. It is possible to reduce the number of capacitors to even one single capacitor on account of the fact, as shown on FIG. 17, that between three phases the sum of the positive currents commutated by $C_P$ is equal to the sum of the negative currents commutated by $C_N$ and therefore the connection to the neutral N carries no current and can be differed as by combining the two capacitors. As shown, this three phase cycloconverter is comprised of two "banks" of thyristor for each output phase; each bank provides only one polarity of output current.

Figure 19:
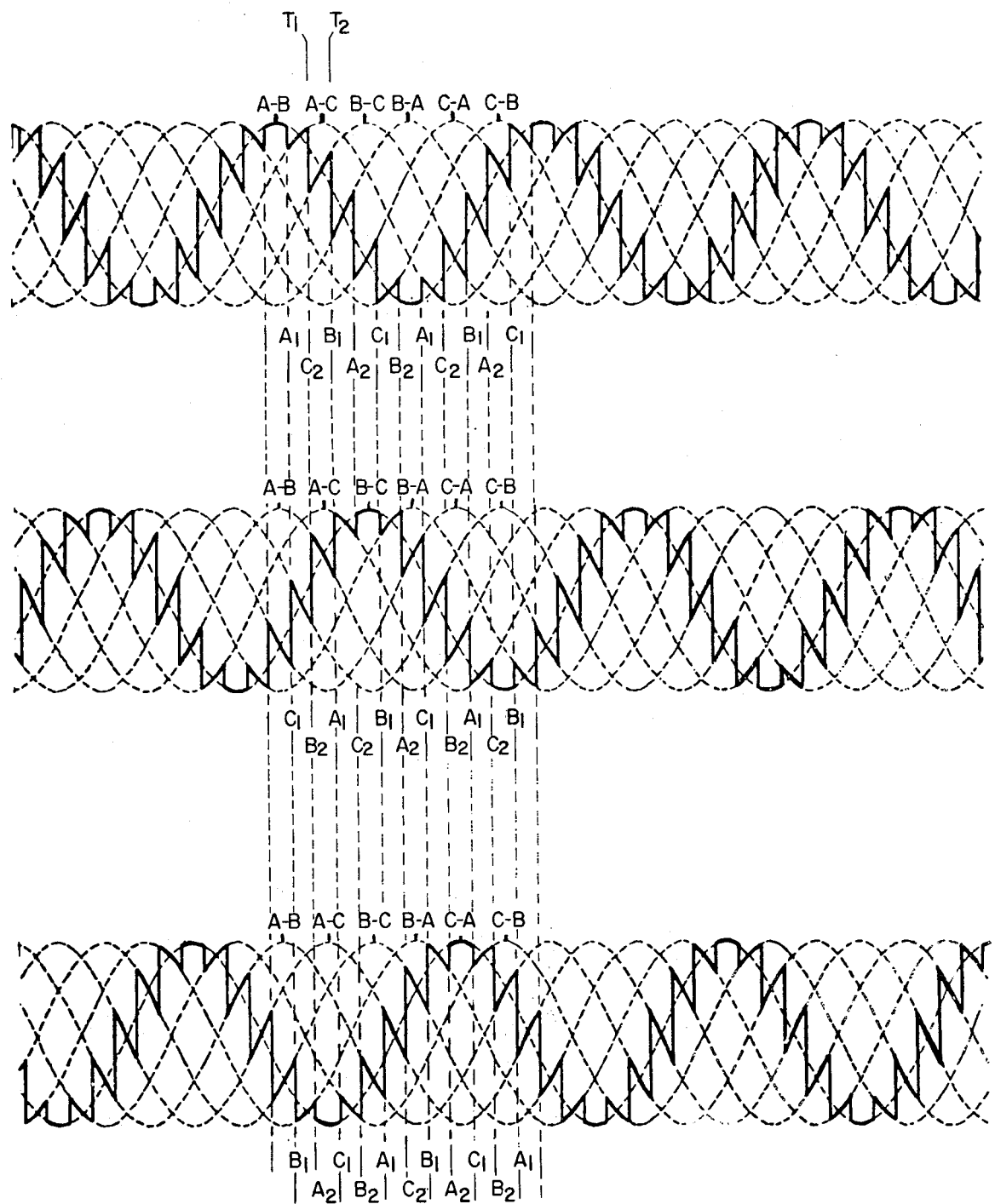
FIG. 19 shows typical output waveforms and the conduction sequence of the main switches in a three-phase bridge cycloconverter of the unrestricted frequency changer type.

It is useful at this point to consider the basic operation of a UFC cycloconverter. Referring now to FIG. 19 in a three phase bridge type of cycloconverter the output voltage waveforms of the U.F.C. and the corresponding conduction sequences of the relevant thyristors are shown. During conduction intervals $A_1$, $A_2$, etc. either thyristors $A_{1+}$, $A_{2+}$ etc. or $A_{1-}$, $A_{2-}$, etc. could conduct depending upon the polarity of the output current. These conduction sequences indicate that a group of three devices are commutated simultaneously and the commutation of the "upper" devices (index$_1$) alternates with that of the "lower" devices (index$_2$). Generally, one thyristor in any group of three to be commutated is faced opposite to the other two, i.e., at any commutation instant one output current may be positive (supplied by the thyristors in the "positive" bank of the appropriate output phase) and the other two negative (supplied by the thyristors of the appropriate negative banks), or vice versa. The instantaneous polarity of each output current will therefore determine whether the commutation will be initiated by the relevant positively faced commutating thyristors ($X_{1+}$ and $X_{2+}$) or by the negatively faced ones ($X_{1-}$ and $X_{2-}$). (Care must be exercised in determining the polarity of the output current in the vicinity of their zero crossing points).

For the purpose of explanation let us consider the commutations which take place at time $T_1$, for the case of unity power factor load. Assume that the capacitors are precharged to a sufficient level with the polarities indicated in FIG. 18. Just before time $T_1$, the following thyristors will be conducting:

$A_{1+}$ and $C_{2+}$ on Phase I,
$C_{1+}$ and $B_{2+}$ on Phase II, and
$B_{1-}$ and $A_{2-}$ on Phase III.

At time $T_1$, the required commutations and reversal of capacitor charges will be accomplished by firing thyristors $X_{1+}$ on Phase I, $X_{1+}$ on Phase II, and $X_{1-}$ on Phase III. The sum of the positive currents flowing in Phases I and II, is supplied by capacitor $C_P$ and the negative current flowing in Phase III is supplied by capacitor $C_N$ during the commutation interval. When the commutation intervals are complete and both capacitors have their charge fully reversed, opposite to polarity shown, the following thyristors will be conducting:

$B_{1+}$ and $C_{2+}$ on Phase I,
$A_{1+}$ and $B_{2+}$ on Phase II, and
$C_{1-}$ and $A_{2-}$ on Phase III.

Figure 20:
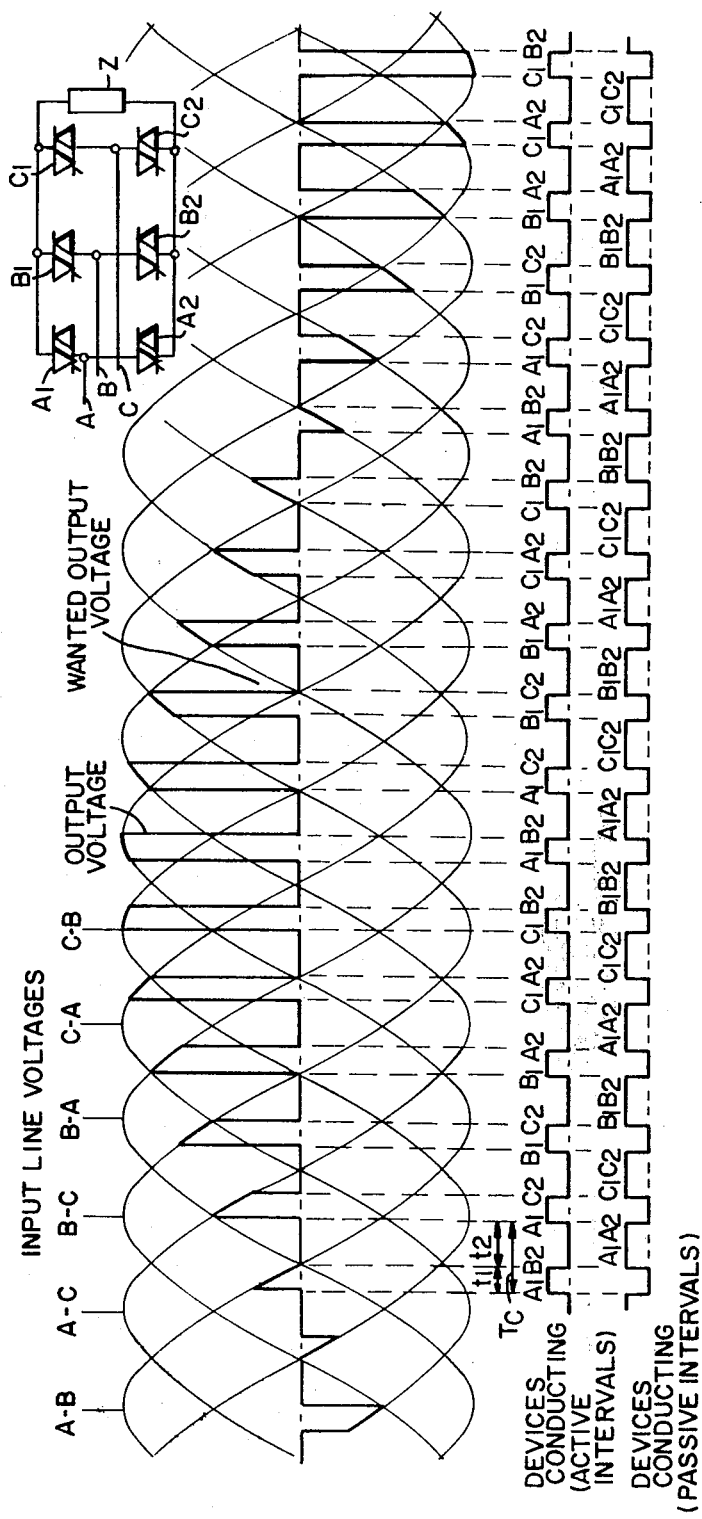
FIG. 20 shows the conduction sequence of the main switches of a force commutated cycloconverter using pulsewidth modulation for output voltage control.
Figure 21:
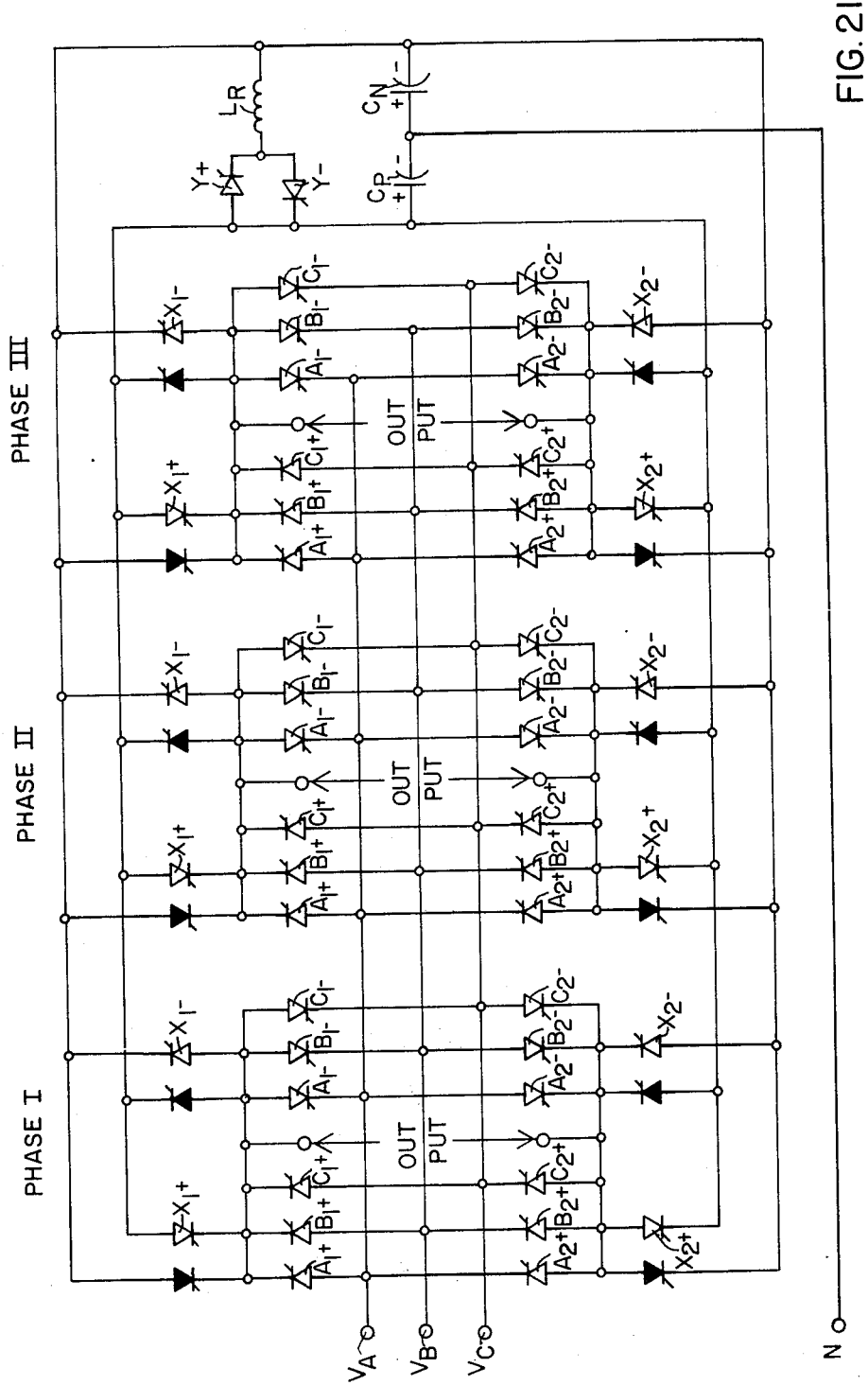
FIG. 21 is a three-phase bridge cycloconverter using direct capacitor commutation as required by the present invention, with additional switches for pulse width modulation control.
Figure 22:
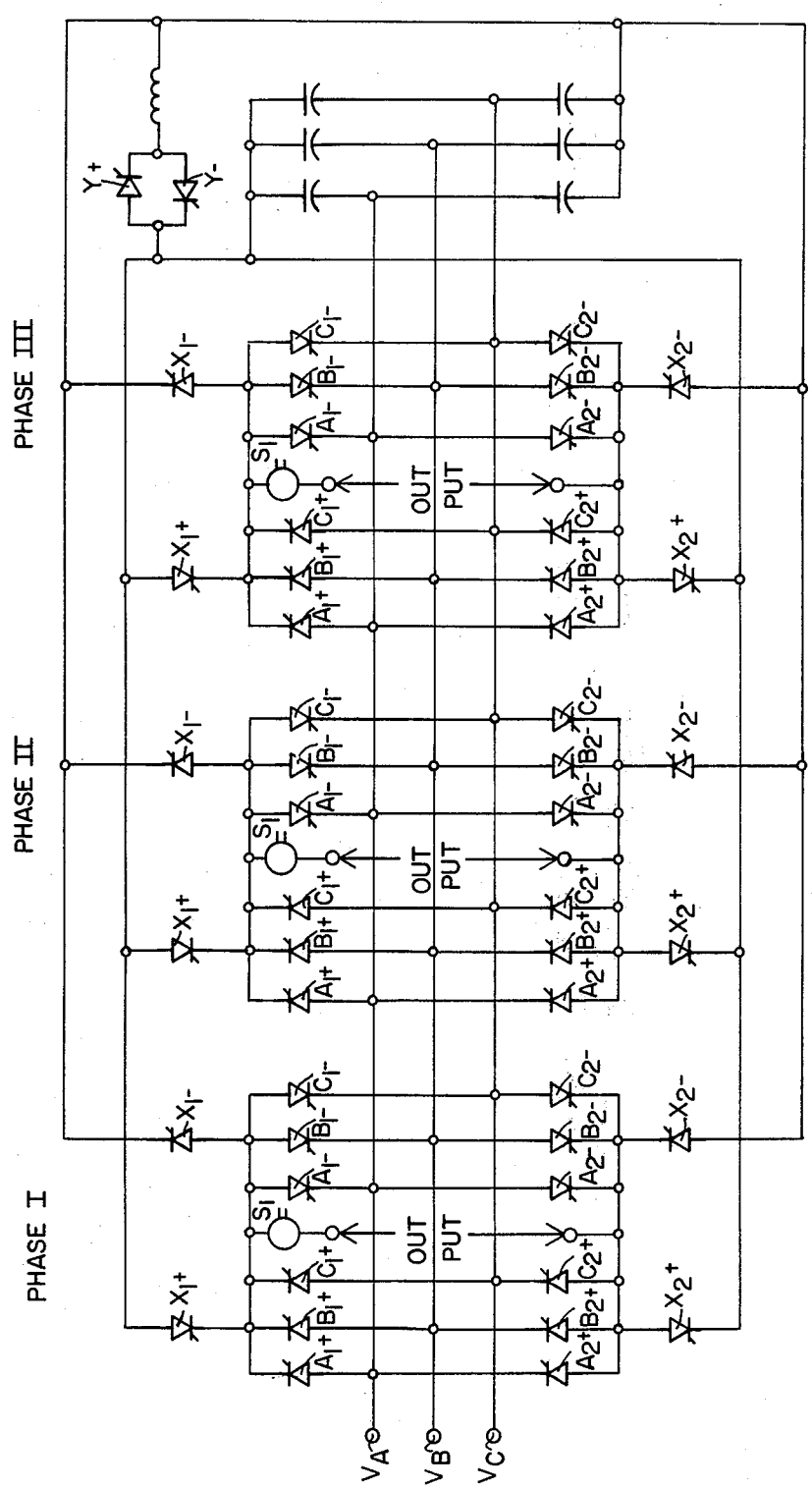
FIG. 22 is a three-phase bridge cycloconverter with direct capacitor commutation but not requiring a neutral connection.
Figure 23:
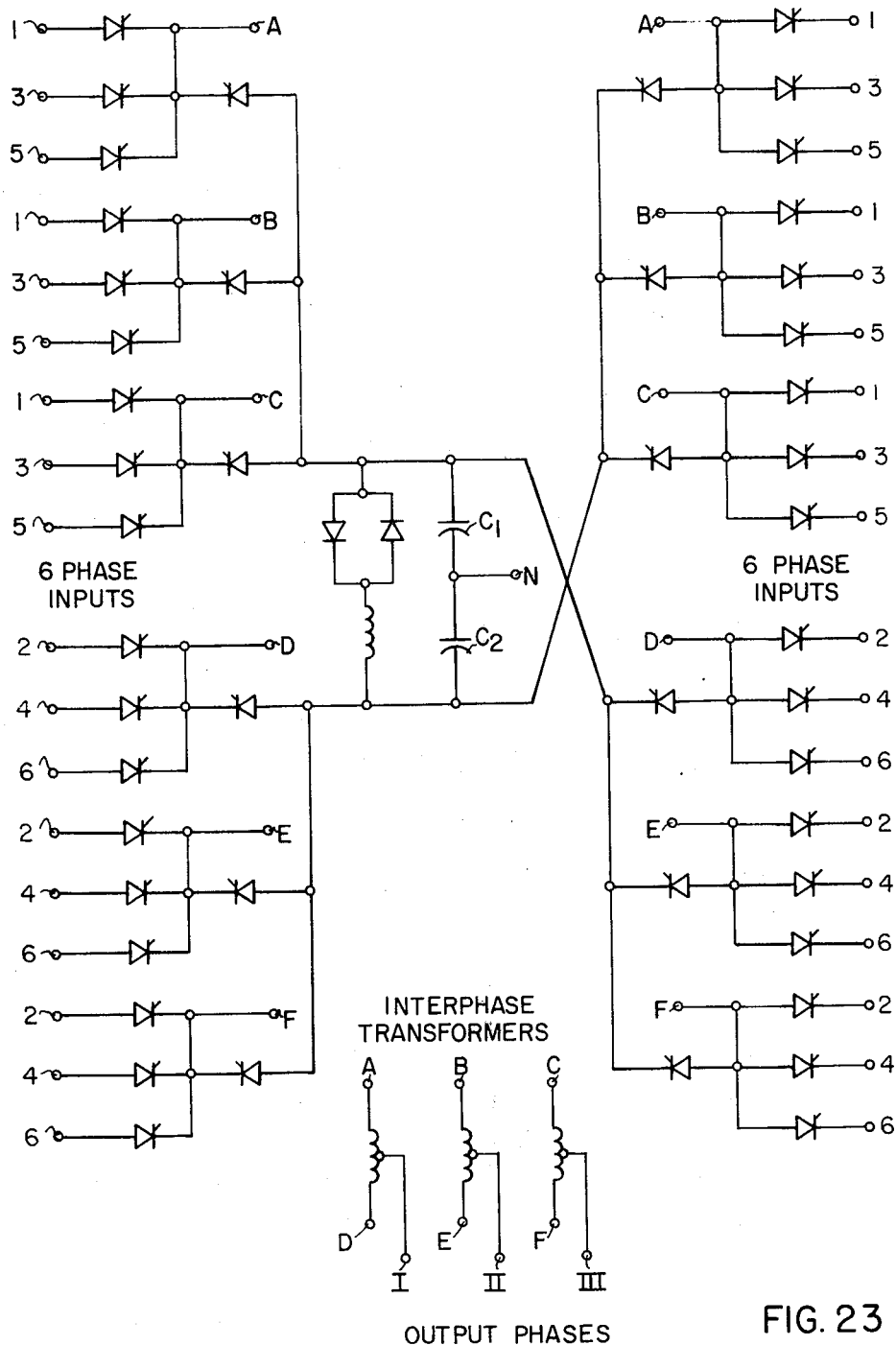
FIG. 23 is a three-phase direct capacitor commutated six-phase mid-point cycloconverter.

At instant $T_2$ commutation of devices $C_{2+}$, $B_{2+}$ and $A_{2-}$ will be accomplished by firing thyristors $X_{2+}$, $X_{2+}$ and $X_{2-}$ on Phases I, II and III, respectively. The charges on both commutating capacitors are therefore reversed again, i.e., their original charges with polarity as indicated are now restored. Since for balanced load conditions the total positive and total negative current, supplied by the commutating capacitors is equal, their rate of change of voltage is also equal. The actual rate of change of capacitor voltage is load dependent and could present difficulties at light loads. These difficulties can be easily overcome however by using additional circuitry to resonantly reverse the capacitor charge as previously described. Many variations of this commutation circuit are possible to accommodate various operating requirements in different circuit configurations. FIGS. 21, 22 and 23 are typical of such other configurations. A control pattern such as illustrated in FIG. 20 in which voltage regulation by pulse width modulation can be accomplished as generally known can be used in the context of a bridge cycloconverter by duplicating all the forced commutating components of the circuit according to the present invention. More efficiently, the invention can be used in the context of the cycloconverter configuration of FIG. 21 by the addition of separate thyristors to terminate passive conduction intervals as shown in solid in FIG. 21.

Figure 24:
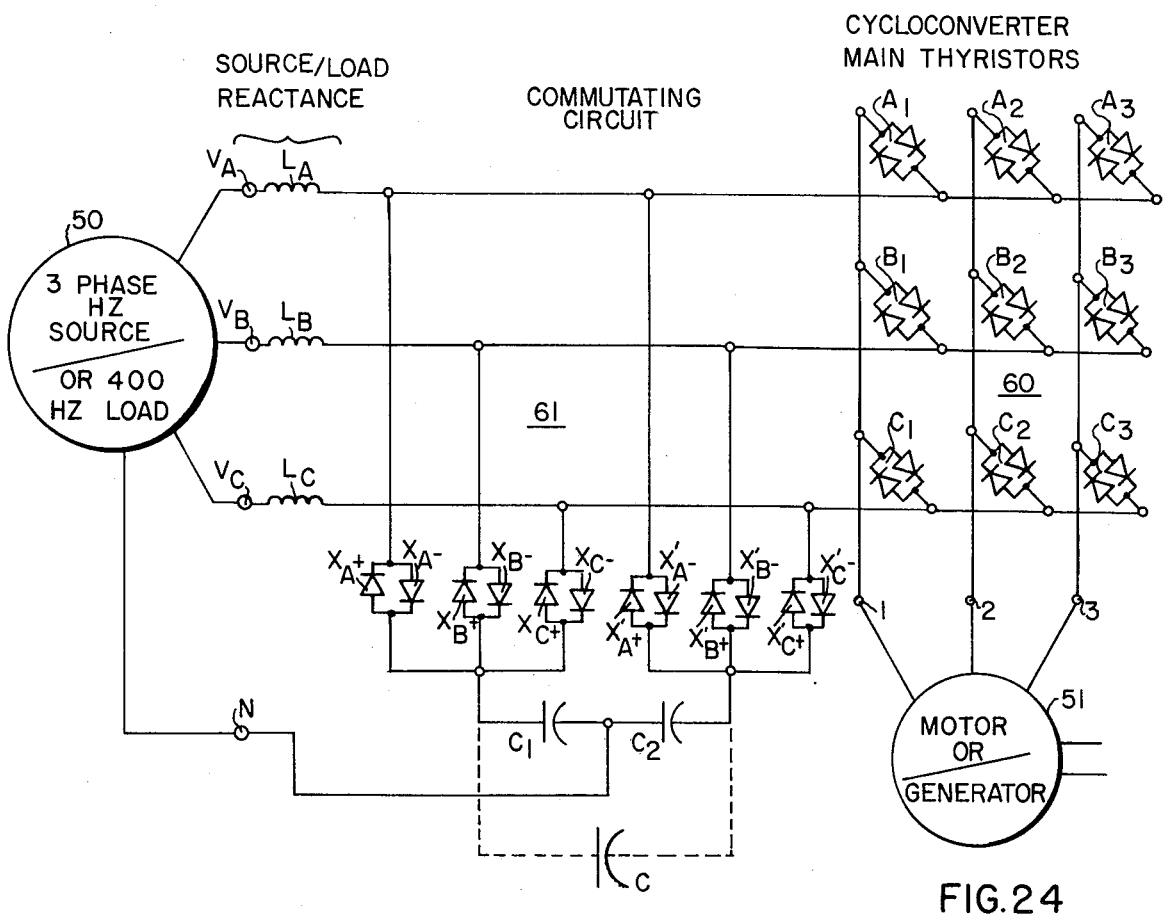
FIG. 24 shows a dual power flow electrical system embodying the present invention.

FIG. 24 shows a dual power flow electrical system including an improved cycloconverter embodying the teachings of the present invention. Two three-phase terminals A, B, C and 1, 2, 3 of a cycloconverter 60 are connected with electrical installations, respectively 50 and 51 which under a selected condition of operation are in the relation of power generator to load. Thus 50 may be a three-phase AC source when 51 is a motor, and 50 may be a load when 51 is an electrical generator. This situation is encountered in practice with the electrical system of an aircraft. In a first mode, when the aircraft is on the ground, a local source of energy at 60 Hz can be used as the source 50 to be converted to a frequency from 0 up to 800 Hz in order to start the engine when coupled to a motor as the load 51. In such mode, the cycloconverter is operated in the reverse mode. The forced commutation circuit 61 is connected between the three phases A, B, C and the neutral N. As it appears force commutation is with this first mode of the input line type. In the second mode, the source 51 is the alternator on board of the aircraft powered by the engine. The load is now the electrical installation on board of the aircraft which is connected on the output side A, B, C as the load 50, after conversion to a constant frequency of 400 Hz from a variable alternator frequency aroud 1200 Hz, for instance. Here, the forced commutation circuit according to the present invention is of the load commutation type. The cycloconverter 60 is represented with the main thyristor $A_1$, $A_2$, $A_3$, $B_1$, $B_2$, $B_3$ and $C_1$, $C_2$, $C_3$. The auxiliary thyristors within circuit 61 appear as $X_{A+}X'_{A-}$, $X_{B+}X'_{B-}$, $X_{C+}X'_{C-}$ and $X'_{A+}$ to $X'_{C-}$ respectively for two capacitors $C_1$ and $C_2$.

As shown in dotted lines, the two capacitors $C_1$, $C_2$ may be replaced by one under ideal balanced conditions, thus dispensing with a neutral connection.

To dispense with the neutral connection, the original commutating capacitors may be each substituted with three of one third of the original value, connected in Wye to the balanced input phases as illustrated in FIG. 22. Since the currents commutated by each set of capacitors are equal in magnitude but opposite in polarity, no pulses of current corresponding to the capacitors commutating impulse will flow in the input lines. Conversely, since the input line voltages are balanced, the commutating potential at each mid-point of the capacitors will not be effected by the resulting balanced fundamental components of capacitive current. Devices $S_1$, $S_2$, $S_3$ are provided for sensing the polarity of the load currents so that appropriate operation of the commutation can be implemented.

The application of this type of commutation is not restricted to bridge configurations, a 6 pulse three-phase, mid-point or Wye configuration is shown in FIG. 23.

In FIG. 24 the reactance of the source or load 50 is represented by inductors $L_A$, $L_B$, $L_C$ for the respective phases.

It appears from the preceding description that several advantages are obtained with the circuit according to the present invention:

1. Forced commutation of a three phase balanced loaded cycloconverter can be accomplished in a simple but very efficient manner.
2. Only two commutating capacitors are required which can be utilized with maximum efficiency in three phase cycloconverter configurations.
3. The thyristors used in the commutation circuit need only be of relatively low rating and do not need to have fast turn off capability.
4. Using an uunrestricted frequency changer (U.F.C.) employing direct capacitor forced commutation very efficient direct frequency conversion is possible, while power can flow in either direction (with a load generative or regenerative). Such a system is ideal for high power, and very high power AC variable speed drive systems.
5. In this system which accomplishes frequency conversion in a single stage, the total rating of the force commutating components, and the cost of the system, is only a fraction of that which would be required for an equivalent inverter-converter combination.
6. A high power system could have an output frequency range of zero to about 120 Hz. For a low power system this range may be increased up to about 400 Hz.

These advantages are due to unique and novel features such as the following:

1. A single or three phase cycloconverter employing suitably charged thyristor switched capacitors, each used to accomplish forced commutation of all output phases by alternately furnishing positive and negative load currents, so that the charge on the capacitor automatically reverses at each commutation, in preparation for the next commutation.
2. A system such as in 1, having a thyristor controlled inductor connected in parallel with the capacitors and used to assist in the reversal of the capacitor charge in the absence of sufficient load current.
3. Three phase embodiments of a system such as 1, or 2 whereby commutation of a cycloconverter having three balanced output currents is accomplished with only the capacitors that would be required to achieve commutation on each of the output phases if used separately.
4. The incorporation of three capacitors connected in Wye within a balanced input system, to substitute an original capacitor of the same total capacitance, thereby eliminating the necessity of a neutral connection.
5. Any of the above features in any combination.

We claim:
1. An AC to AC static frequency changer apparatus for developing an AC output voltage across a load, comprising in combination, an AC polyphase input power source, pairs of cyclically controlled directional main switching means associated by pairs with each phase of said power source, each pair comprising first and second main switching means coupled for conduction for out-going and incoming load current relations, respectively, with respect to said load, at least one pair of first and second cyclically controlled directional auxiliary switching means coupled for conduction for out-going and incoming load current relations, respectively, with respect to said load, and capacitor means common to said first and second auxiliary switching means for supplying a reverse voltage alternately to said first and second main switching means for all pairs when a corresponding one of said first and second auxiliary switching means is controlled for conduction, and to establish a temporary load current path via said conductive one of said first and second auxiliary switching means in derivation to the load current from at least one of said main switching means for commutation thereof.

2. A force commutation static frequency changer for supplying with alternating current a load from a polyphase alternating current source via cyclically and temporarily conductive main controllable rectifiers associated in pairs with the respective phases of the alternating current source comprising:
capacitor means in series combination with auxiliary controllable rectifier means for applying a predetermined voltage in the reverse direction with respect to any of said main controllable rectifiers and for establishing a temporary path for said load current in derivation with respect to a conductive one of said main controllable rectifiers, said predetermined voltage being larger than the line to neutral voltage applied to said conductive main controllable rectifier thereby to turn it OFF after said temporary path has been established at the magnitude of said load current, said series combination being connected in parallel with said main controllable rectifiers and in series with said load and said alternating current source.

3. A force commutation static frequency changer according to claim 2 wherein each of said pairs of main controllable rectifiers includes a first main controllable rectifiers oriented to pass current in the direction to said load and a second main controllable rectifier oriented to pass current in a direction from said load, wherein said auxiliary controllable rectifier means includes a first auxiliary controllable rectifier connected by one end to said load in a direction to pass current thereto, and connected to each main controllable rectifier of the first type, and a second auxiliary controllable rectifier connected by one end to said load in a direction to pass current therefrom and connected to each main controllable rectifier of the second type, and wherein said capacitor means is connected to the other ends of said first and second auxiliary controllable rectifiers.

4. A force commutation static frequency changer according to claim 3 wherein said main controllable rectifiers are cyclically controlled for temporary conduction alternately of one of said first type and of one of said second type, and wherein said first and second auxiliary controllable rectifiers are controlled for conduction alternately and in correspondency with conduction within said first and second types of main controllable rectifiers.

5. A force commutation static frequency changer according to claim 2 wherein said capacitor means is discharged by said load current through one of said auxiliary controllable rectifiers when controlled for conduction, and is recharged by said load current to the opposite polarity for said predetermined voltage prior to conduction of the other of said auxiliary controllable rectifiers.

6. A force commutation static frequency changer according to claim 5 wherein said capacitor means is charged linearly under said load current.

7. A force commutation static frequency changer according to claim 6 with means for reducing the time required for discharging and recharging said capacitor means.

8. A force commutation static frequency changer according to claim 7 wherein said time reducing means includes inductance means controllably connected in parallel with said capacitor means.

9. A force commutation static frequency changer according to claim 8 wherein said controllably connected inductor means includes an inductance and additional controllable rectifier means connected in series with said inductance, said additional controllable rectifier means being selectively operable in the direction of discharge of said capacitor means under conduction of one of said first and second auxiliary controllable rectifiers.

10. A force commutation static frequency changer according to claim 9 wherein said inductance is resonantly related to the capacitance of said capacitor means.

11. A force commutation static frequency changer according to claim 10 wherein said additional controllable rectifier means includes first and second additional controllable rectifiers associated with said first and second auxiliary controllable rectifiers respectively said additional controllable rectifiers being controlled for conduction at least (concurrently with) control of conduction of the corresponding auxiliary controllable rectifier.

12. A force commutation static frequency changer according to claim 4 wherein two groups of said pairs of main controllable rectifier are provided, one positive said group of main controllable rectifiers being associated in a positive bank and one negative said group of main controllable rectifiers being associated in a negative bank, at least two of said means for applying a predetermined voltage and for establishing a temporary path being provided, one associated with said positive group and said load, the other associated with said negative group and said load.

13. A force commutation static frequency changer according to claim 4 wherein said means for applying a predetermined voltage and for establishing a temporary path is applied simultaneously to the main controllable rectifiers of one output phase within the pairs of one bank and simultaneously to the main controllable rectifiers of the two other output phases within the pairs of the other bank.

14. A force commutation static frequency changer according to claim 13, wherein said load is a balanced polyphase load supplied with alternating currents, said alternating currents being symmetrically derived during commutation from opposite ends of said capacitor means to pass into said temporary path instantaneously summed positive and negative currents.

15. A force commutation static frequency changer according to claim 14, wherein said alternating current source is provided with a neutral terminal; and wherein said capacitor means includes two series connected capacitors having a common point, said common point being connected to said neutral terminal.

16. A force commutation static frequency changer according to claim 12 wherein means is provided for sensing the polarity of the load current through zero crossing, and wherein said means for applying a predetermined voltage and for establishing a temporary path is responsive to said sensing means.

17. A force commutation static frequency changer according to claim 12 wherein said forced commutation frequency changer is voltage controlled by pulse width modulation and wherein antiparallel controllable rectifiers are associated with said auxiliary controllable rectifiers for selectively terminating conduction thereof.

18. A force commutation static frequency changer according to claim 12 wherein said means for applying a predetermined voltage and for establishing a temporary path is connected between one end of said load and a neutral connection to said polyphase alternating current source.

19. A force commutation static frequency changer according to claim 12 wherein said capacitor means is divided into three capacitors of one-third capacity connected in Wye across said source, said source being a three-phase source, and wherein said three capacitors are connected by a common point to the associated auxiliary controllable rectifier so that said predetermined voltage is developed at said common point and is unaffected by the balanced three-phases of said source.

20. A force commutation static frequency changer according to claim 4 wherein at least two groups of said pairs of main controller rectifiers are provided, one positive said group being in a positive bank relative to said load and one negative said group being in a negative bank relative to said load, said means for applying a predetermined voltage and for establishing a temporary path being common to said positive and negative banks.

21. A force commutation static frequency changer according to claim 20 wherein said means for applying a predetermined voltage and for establishing a temporary path includes capacitor means common to said positive and negative banks and two sets of said first and second auxiliary controllable rectifiers associated with said bank respectively.

22. A force commutation frequency changer according to claim 20 wherein said means for applying a predetermined voltage and for establishing a temporary path includes first and second capacitor means associated with two sets of said first and second auxiliary controllable rectifiers, said sets corresponding to respective ones of said positive and negative banks, and wherein one of said first and second capacitor means is charged when the other of said first and second capacitor means is charged with a predetermined voltage of opposite polarity.

23. An AC to AC static frequency charger apparatus having first and second terminals for developing a polyphase AC output voltage of a predetermined frequency at one of said first and second terminals from a polyphase AC input voltage of a given frequency applied at the other of said first and second terminals for power flow therebetween comprising a plurality of unilateral main switching means cyclically and temporarily controlled for conduction, said main switching means being associated in pairs with the respective phases of the input terminals, and capacitor means in series combination with auxiliary controllable rectifier means for applying a reversed voltage in the reverse direction with respect to any of said main switching means and for establishing a temporary path for the load current in derivation with respect to a conductive one of said main switching means, said reverse voltage being larger than the forward voltage of said conductive main switching means, thereby to turn it OFF after said temporary path has been established at the magnitude of said load current, wherein said capacitor means is connected in series with one of said first and second terminals and in parallel with a selected group of said main switching means including said conductive one.

* * * * *